United States Patent
Kitagawa

(10) Patent No.: US 8,471,511 B2
(45) Date of Patent: Jun. 25, 2013

(54) BRUSHLESS MOTOR CONTROL DEVICE AND BRUSHLESS MOTOR

(75) Inventor: Takayuki Kitagawa, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 13/316,712

(22) Filed: Dec. 12, 2011

(65) Prior Publication Data

US 2012/0161680 A1  Jun. 28, 2012

(30) Foreign Application Priority Data

Dec. 27, 2010  (JP) .................................. 2010-290788
Sep. 9, 2011  (JP) .................................. 2011-197452

(51) Int. Cl.
*H02P 7/00* (2006.01)

(52) U.S. Cl.
USPC ...... 318/432; 318/400.01; 318/437; 318/729; 323/207; 323/222; 323/282; 363/16; 363/27; 363/21.01; 363/126; 363/80; 307/45; 307/46; 236/11; 236/44; 347/10; 347/11; 347/14; 347/17; 347/23

(58) Field of Classification Search
USPC ............. 318/400.01, 400.04, 400.09, 400.08, 318/400.03, 400.11, 434, 437, 729, 438, 318/809, 400.36; 323/207, 222, 282; 363/16, 363/27, 80, 89, 97, 34, 15, 20, 21.01, 126; 347/11, 10, 14, 134, 17, 60, 23; 236/44, 11; 307/45, 46
See application file for complete search history.

(56) References Cited

U.S. PATENT DOCUMENTS

| | | | | |
|---|---|---|---|---|
| 5,492,273 A | * | 2/1996 | Shah | 236/44 A |
| 6,396,225 B1 | * | 5/2002 | Wakui et al. | 318/400.01 |
| 6,995,679 B2 | * | 2/2006 | Eskritt et al. | 340/686.1 |
| 7,183,737 B2 | * | 2/2007 | Kitagawa | 318/599 |
| 8,358,098 B2 | * | 1/2013 | Skinner et al. | 318/729 |
| 2006/0012324 A1 | * | 1/2006 | Eskritt et al. | 318/437 |
| 2006/0056823 A1 | * | 3/2006 | Wu et al. | 388/831 |
| 2008/0272732 A1 | * | 11/2008 | Schulz et al. | 318/811 |
| 2010/0245521 A1 | * | 9/2010 | Kubo | 347/134 |

FOREIGN PATENT DOCUMENTS

| | | | | |
|---|---|---|---|---|
| JP | 08009681 A | * | 1/1996 | |
| JP | A-8-009681 | | 1/1996 | |
| JP | 2003299378 A | * | 9/2006 | |
| JP | B2-3854186 | | 9/2006 | |

* cited by examiner

*Primary Examiner* — Lincoln Donovan
*Assistant Examiner* — Jorge Carrasquillo
(74) *Attorney, Agent, or Firm* — Posz Law Group, PLC

(57) ABSTRACT

A voltage application unit causes switching elements to apply voltage to flow an electric current into corresponding windings to generate a revolving magnetic field. A period derivation unit derives an energization period of the windings. A signal generation unit generates a PWM signal for causing the voltage application unit to activate and deactivate the switching elements, such that a duty ratio decreases gradually in a predetermined time period subsequent to the derived energization period. A period specifying unit specifies a detection period of an electric current, which is supplied from the switching elements presently switched and deactivated, by a predetermined time period between an edge, which is caused when the PWM signal changes in level to deactivate the switching elements, and a time point in advance of the edge in the energization period.

9 Claims, 15 Drawing Sheets

COMPLEMENTARY PWM CONTROL

LOWER-STAGE PWM SLOPE CONTROL

BRUSHLESS MOTOR CONTROL DEVICE AND BRUSHLESS MOTOR

CROSS REFERENCE TO RELATED APPLICATIONS

This application is based on Japanese Patent Applications No. 2010-290788 filed on Dec. 27, 2010 and No. 2011-197452 filed on Sep. 9, 2011, the contents of which are incorporated in their entirely herein by reference.

TECHNICAL FIELD

The present invention relates to a brushless motor control device, which has a PWM control configuration, and a brushless motor.

BACKGROUND

For example, a brushless motor is employed as a blower motor for a vehicular airconditioner. For example, pulse width modulation control (PWM control) is known as a control method for controlling rotation speed of the brushless motor. The PWM control is implemented by activating and deactivating a field-effect transistor (FET) for supplying a driving current to a motor thereby to output a PWM signal in a pulse shape. Thus, the duty ratio of the PWM signal is modified to control rotation of the motor.

The present applicant discloses a PWM control for a brushless motor in publication of Japanese patent 3854186 in which a duty ratio of a PWM signal is gradually reduced in the end of electricity supply to each coil of the brushless motor. Specifically, a slope section is added to the end of the electricity supply gently to switch electricity supplied to the coil thereby to cause the electricity supplied to each coil of the brushless motor in an asymmetric waveform.

For example, a motor, such as a brushless motor, may be equipped with a protection circuit for detecting an electric current flowing into the motor and for terminating electricity supply to avoid excessive electric current flow when detecting excessive electric current flow into the motor.

An electric current, which flows into a motor, changes gently as compared with a PWM control signal, which changes stepwise. Therefore, in a case where an electric current flowing into a motor is detected at a detection time point at an intermediate time point in an activation period of a PWM control signal, a sample hold may be caused in the course of increase in an electric current.

In consideration of this, the present applicant discloses a configuration for detecting a motor current value of a brushed DC motor with high accuracy in publication of U.S. Pat. No. 7,183,737 B2 (publication of Japanese patent application No. 2005-51993). Specifically, in the detection configuration, an electric current flowing into the motor is detected in a detection period between an edge time point of an edge of the PWM signal and a time point in advance of the edge time point. At the edge of the PWM signal, the level of the PWM signal changes to deactivate an FET, which is activated to supply a driving current to the brushed DC motor.

It is noted that, the art of the publication of Japanese patent application No. 2005-51993 is for a brushed DC motor and may not be applicable, as it is, to the configuration of the publication of Japanese patent 3854186 in which the slope period is added to the end of the electricity supply to each coil of the brushless motor in order to decrease gradually the duty ratio of the PWM signal. That is, in such a combination, an electric current flowing into the motor may be undetectable steadily in the slope.

SUMMARY

In view of the foregoing and other problems, it is an object of the present invention to produce a control device configured to detect steadily a motor current value of a brushless motor and to produce the brushless motor.

According to an aspect of the present invention, a brushless motor control device comprises a voltage application unit configured to cause each pair of switching elements connected to corresponding windings of a plurality of phases to apply a voltage to the corresponding windings of the phases in order to flow an electric current into the corresponding windings to generate a revolving magnetic field with a permanent magnet to rotate a magneto rotor of a brushless motor. The brushless motor control device further comprises an energization period derivation unit configured to detect rotation of the magneto rotor and to derive an energization period of the windings to generate the revolving magnetic field. The brushless motor control device further comprises a PWM signal generation unit configured to: generate a PWM signal at a duty ratio, which is controlled according to an inputted control signal, in the energization period derived by the derivation unit; generate a PWM signal at a duty ratio decreasing gradually in a predetermined time period subsequent to the energization period; and output the generated PWM signal for causing the voltage application unit to activate and deactivate the switching elements. The brushless motor control device further comprises a detection period specifying unit configured to specify a detection period of the electric current flowing into the windings connected to the switching elements, which are presently switched and deactivated, by a time period, which is from a time point in advance of an edge of the PWM signal by a predetermined period to the edge, the edge being caused when the PWM signal changes to a different level to switch to deactivate the switching elements to control an electric current supplied to the windings.

According to another aspect of the present invention, a brushless motor control device comprises a voltage application unit configured to cause each pair of switching elements connected to corresponding windings of a plurality of phases to apply a voltage to the corresponding windings of the phases in order to flow an electric current into the corresponding windings to generate a revolving magnetic field with a permanent magnet to rotate a magneto rotor of a brushless motor. The brushless motor control device further comprises an energization period derivation unit configured to detect rotation of the magneto rotor and to derive an energization period of the windings to generate the revolving magnetic field. The brushless motor control device further comprises a PWM signal generation unit configured to: generate a PWM signal at a duty ratio, which is controlled according to an inputted control signal in the energization period derived by the derivation unit; generate a PWM signal at a duty ratio decreasing gradually in a predetermined time period subsequent to the energization period; and output the generated PWM signal for causing the voltage application unit to activate and deactivate the switching elements. The brushless motor control device further comprises a detection period specifying unit configured to specify a detection period of the electric current flowing into the windings connected to the switching elements, which are presently switched and deactivated, by first one of time periods subsequent to an end of the energization period, each of the time periods being from a time point in advance of an edge of the PWM signal by a predetermined period to the edge, the edge being caused when the PWM signal changes to a different level to switch to deactivate the switching elements to control an electric current supplied to the windings.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, embodiments will be described with reference to drawings. In the present embodiment, a brushless motor employed as a vehicular motor actuator for an airconditioner and a brushless motor control device will be described in detail.

(Motor Actuator for Vehicular Airconditioner)

Figure 1:
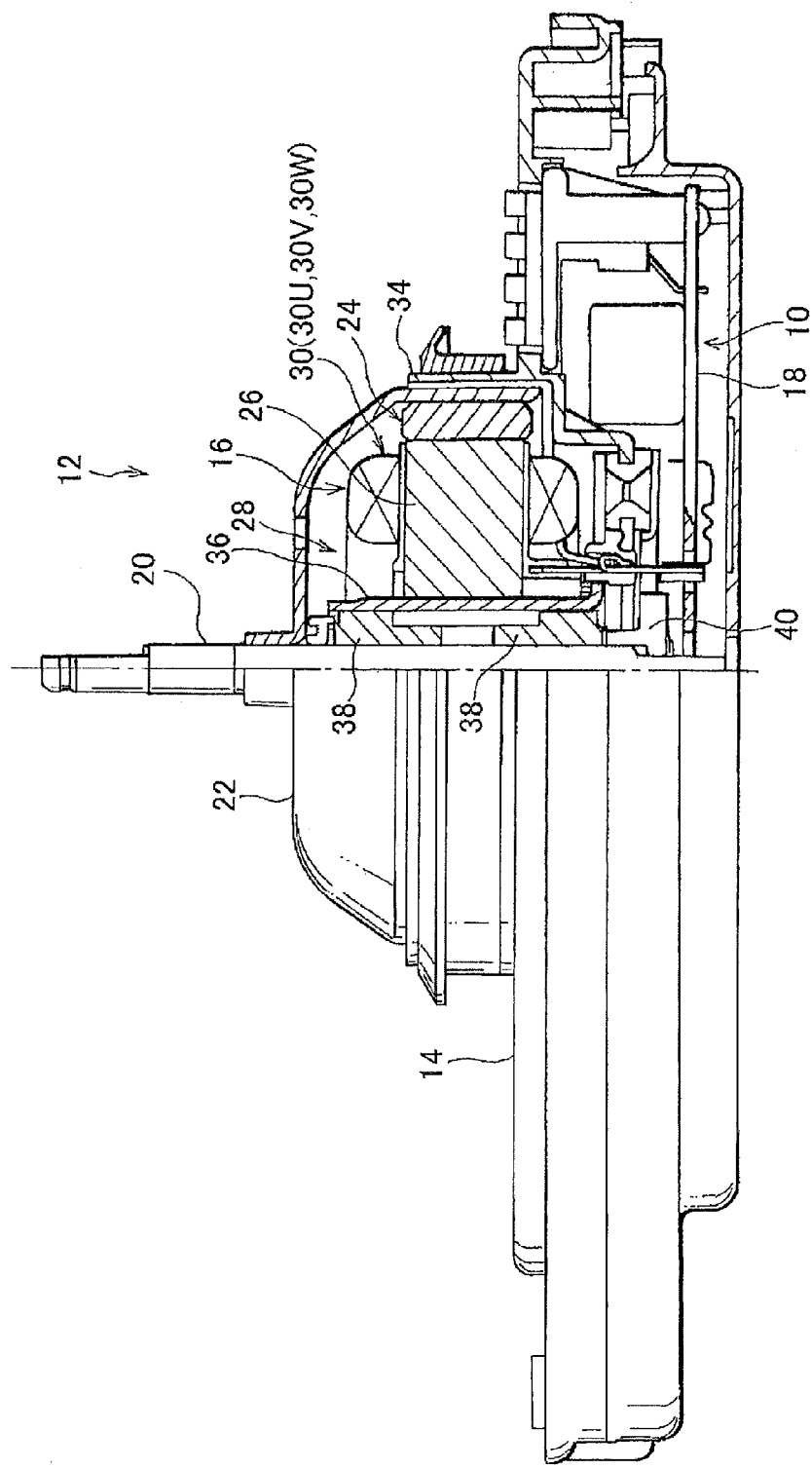
FIG. 1 is a partially sectional view showing an example of a structure of a control device for a brushless motor and a brushless motor actuator equipped with the brushless motor, according to the first embodiment.

In the beginning, a configuration of a motor actuator for a vehicular airconditioner will be described. FIG. 1 is a sectional view showing one example of a motor actuator related to the present embodiment.

As shown in FIG. 1, a motor actuator 12 according to the embodiment includes a housing 14 accommodating a brushless motor (motor) 16 and a control board 18 of a brushless motor control device (motor control device) 10.

As shown in FIG. 1, the housing 14 is formed substantially in a shallow box shape having an opening end. The opening end of the housing 14 is equipped with a tubular portion 34 substantially in a cylindrical shape integrally with the housing 14.

The housing 14 is equipped with a support portion 36 substantially being in a cylindrical shape. The outer circumferential periphery of the support portion 36 is integrally equipped with a stator 28. The stator 28 includes a core 26 formed by laminating multiple core sheets of thin silicon steel plates or the like. A coil group 30 including three-phase coils 30U, 30V, 30W is wound around the core 26. Hereinafter, when the coils 30U, 30V, 30W need not be discriminated from each other, the coils are denoted with a general term of coil 30. Alternatively, when the coils 30U, 30V, 30W need to be discriminated from each other, the coils are denoted with symbols U, V, W. The coils 30 respectively have electric phases shifted by 120 degrees. The coils 30 are configured to form a predetermined revolving magnetic field around the stator 28 when being energized alternately at a predetermined cycle.

A pair of bearings 38 is affixed inside the support portion 36. The bearings 38 support a shaft 20 to be coaxial with and rotatable relative to both the tubular portion 34 and the support portion 36.

One axial end of the shaft 20 extends through the tubular portion 34. The shaft 20 is mechanically connected to a ventilation fan (not shown) in a main body of the airconditioner at the end or around the one end. Thus, the ventilation fan is rotated by the shaft 20.

A rotor 22 is integrally mounted on a portion of the shaft 20 extending out of the tubular portion 34. The rotor 22 is in a bottomed cylindrical shape and is in coaxial with the tubular portion 34 and the support portion 36, which open on the side opposite from the opening side of the housing 14. The shaft 20 extends through the upper portion of the rotor 22.

A rotor magnet 24 substantially being in a cylindrical shape is fixed to the inner periphery of the rotor 22 to be coaxial with the rotor 22. The rotor magnet 24 has radially one side being N pole and a radially another side being S pole through the axial center. The polarity of the magnetic pole changes at a predetermined angular interval, such as 60 degrees, around the axial center thereby to form predetermined magnetic fields therearound.

The rotor magnet 24 is located outside the stator 28 and opposed to the stator 28 along the radial direction of the support portion 36. When the coil 30 is energized to form the revolving magnetic field around the stator 28, the rotor magnet 24 generates torque around the support portion 36 due to the interaction of the revolving magnetic field and the magnetic field formed by the rotor magnet 24, thereby to rotate the shaft 20.

The control board 18 is located at the bottom side of the housing 14 lower than the stator 28. The control board 18 is equipped with a printed wiring to at least one of the front surface and the rear surface. The control board 18 is further equipped with multiple resistive elements, transistor elements, and other components such as a microcomputer (CPU) being suitably connected through the printed wiring.

(Motor Control Device)

Subsequently, an outline of the motor control device 10 (control board 18) will be described. In the present embodiment, the motor control device 10 (control board 18) includes a custom IC. The motor control device 10 according to the present embodiment is configured to implement a driver control of the motor 16. Specifically, the motor control device 10 implements a PWM control to control the duty ratio of a PWM signal thereby to control the rotation speed of the motor 16, in order to restrain generation of heat of electric current output elements FETs 74, FETs 76.

Figure 2:
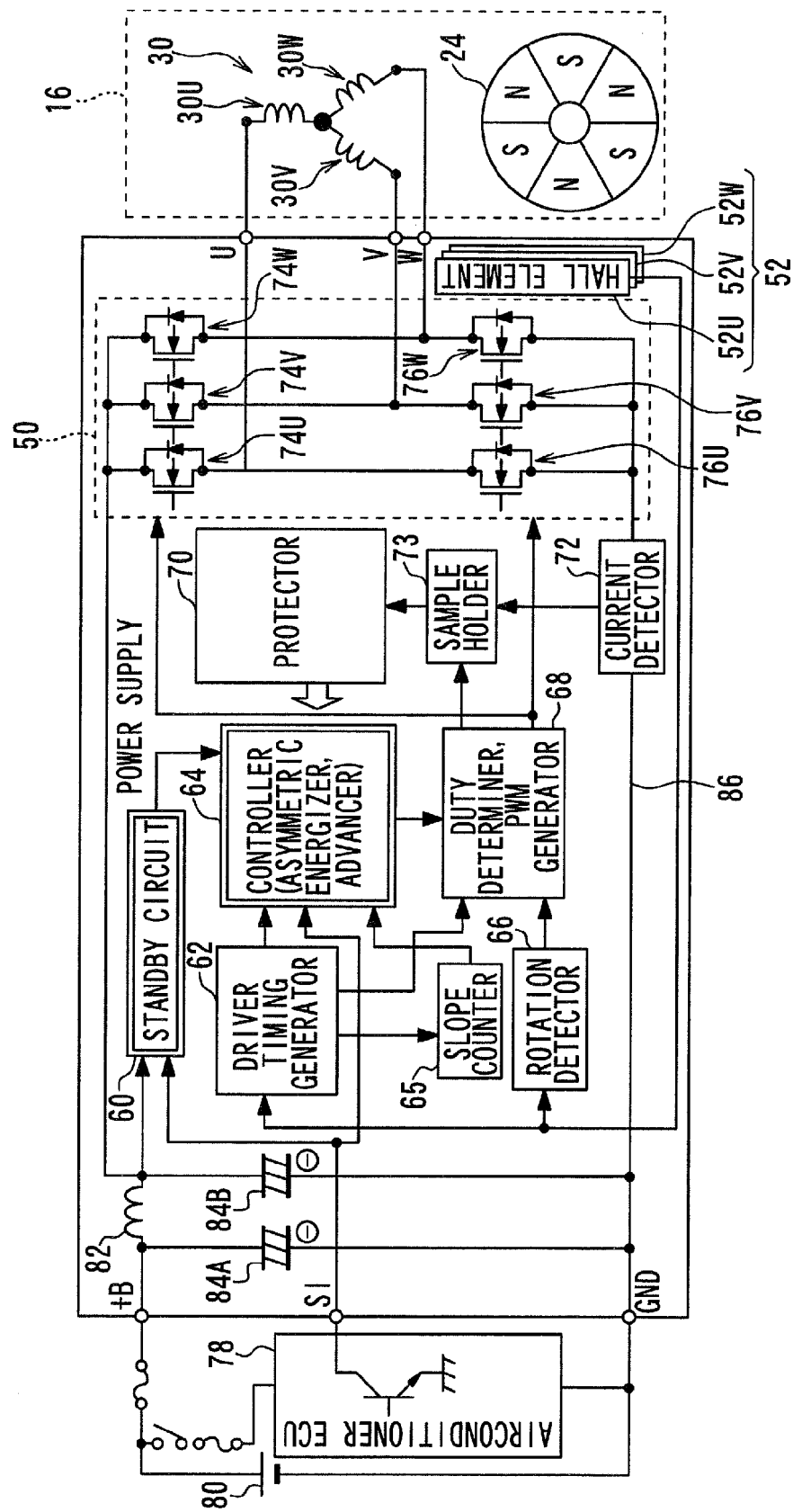
FIG. 2 is a block diagram showing an example of a configuration of the motor control device according to the first embodiment.

FIG. 2 is a block diagram showing one example of a configuration of the motor control device 10 related to the present embodiment. In FIG. 2, the motor 16 is a three-phase six-pole motor.

Referring to FIG. 1, the motor control device 10 of the present embodiment includes a hall element 52 and a sensor magnet 40.

In FIG. 1, the sensor magnet 40 is affixed integrally to the other axial end of the shaft 20 to be coaxial with the shaft 20. The sensor magnet 40 is a permanent magnet, similarly to the rotor magnet 24. More specifically, the sensor magnet 40 is a multi-pole magnet including magnetic pole elements of the N pole and the magnetic pole elements of the S pole being alternately arranged around the axial center at predetermined angular intervals, such as 60 degrees. Thus, the sensor magnet 40 is configured to form a specific magnetic field therearound.

The hall element 52 detects the magnetic field formed with the sensor magnet 40 thereby to detect the rotary position of the rotor 22. The hall element 52 includes a hall sensor 52U, a hall sensor 52V, and a hall sensor 52W respectively corresponding to the poles. The hall sensor 52U, the hall sensor 52V, and the hall sensor 52W are arranged around the axial center of the sensor magnet 40 at intervals of 20 degrees and opposed to the sensor magnet 40. The hall sensors 52U, 52V, 52W respectively detect the lines of magnetic force forming the magnetic field of the sensor magnet 40 at respective positions. Thus, the hall sensors 52U, 52V, 52W respectively output position detection signals including an output signal U, an output signal V, and an output signal W.

In the present embodiment, the control board 18 of the motor control device 10 is equipped with a voltage supply portion 50, a standby circuit 60, a drive timing generating portion 62, a control unit 64, a slope counter 65, a rotation speed detection unit 66, a PWM generation unit 68, a protection circuit 70, a current detection unit 72, a sample hold circuit 73, and the like. In addition, the control board 18 is equipped with an airconditioner electronic control unit (airconditioner ECU) 78, a power source 80, a power factor improvement reactor 82, smoothing capacitors 84A, 84B, and the like. The power source 80, the power factor improvement reactor 82, and the smoothing capacitors 84A and 84B construct a substantially direct-current power source. The airconditioner ECU 78 is an electronic control unit of an airconditioner (vehicular airconditioner). When a user causes the airconditioner ECU 78 to activate the airconditioner, the motor control device 10 controls start of the motor 16. When a user controls the operation of the airconditioner, the airconditioner ECU 78 receives a signal for instructing the rotation speed of the rotor 22 of the motor 16.

A standby circuit 60 controls power supply from the power source 80 to each component. The standby circuit 60 according to the present embodiment controls and restrains a weak electric current flowing from the power source 80 into the airconditioner even when the airconditioner is halted.

The drive timing generating portion 62 derives an electricity supply period for each of the coils 30 and generates the timing of electricity supply to each coil 30, according to the output signals U, V, W inputted from the hall element 52 and representing the position of the rotor 22.

The rotation speed detection unit 66 detects the rotation speed of the rotor 22 according to the output signals U, V, W inputted from the hall element 52.

When being supplied with electricity from the standby circuit 60, the control unit 64 outputs a control signal to the PWM generation unit 68 for controlling the angular speed (advanced angle) of the rotor 22 according to the rotation speed of the rotor 22 instructed by the airconditioner ECU 78 and the drive timing generated by the drive timing generating portion 62.

The control unit 64 according to the present embodiment controls the PWM generation unit 68 to output a count value of the slope counter 65 to the FET 74 and FET 76 in a predetermined time period from a time point at which a voltage value outputted from the FET 74 and the FET 76 to the coil 30 is switched to zero. In the following description, the present control is denoted with an asymmetrical electricity supply control.

The PWM generation unit 68 implements the PWM control. Specifically, the PWM generation unit 68 determines a drive duty value (DUTY) D according to the output of the rotation speed detection unit 66 and the control signal from the control unit 64. The PWM generation unit 68 further generates the PWM signal, which is a pulse signal having a pulse width according to the level of the signal inputted from the airconditioner ECU 78, and outputs the generated PWM signal.

The PWM generation unit 68 includes a drive duty determination unit and a PWM timer (none shown). The PWM generation unit 68 generates a signal having a pulse width according to the determined drive duty value D using the PWM timer and outputs the generated signal as a PWM signal. In the present embodiment, the output duty value is handled as a digital value.

Figure 3:
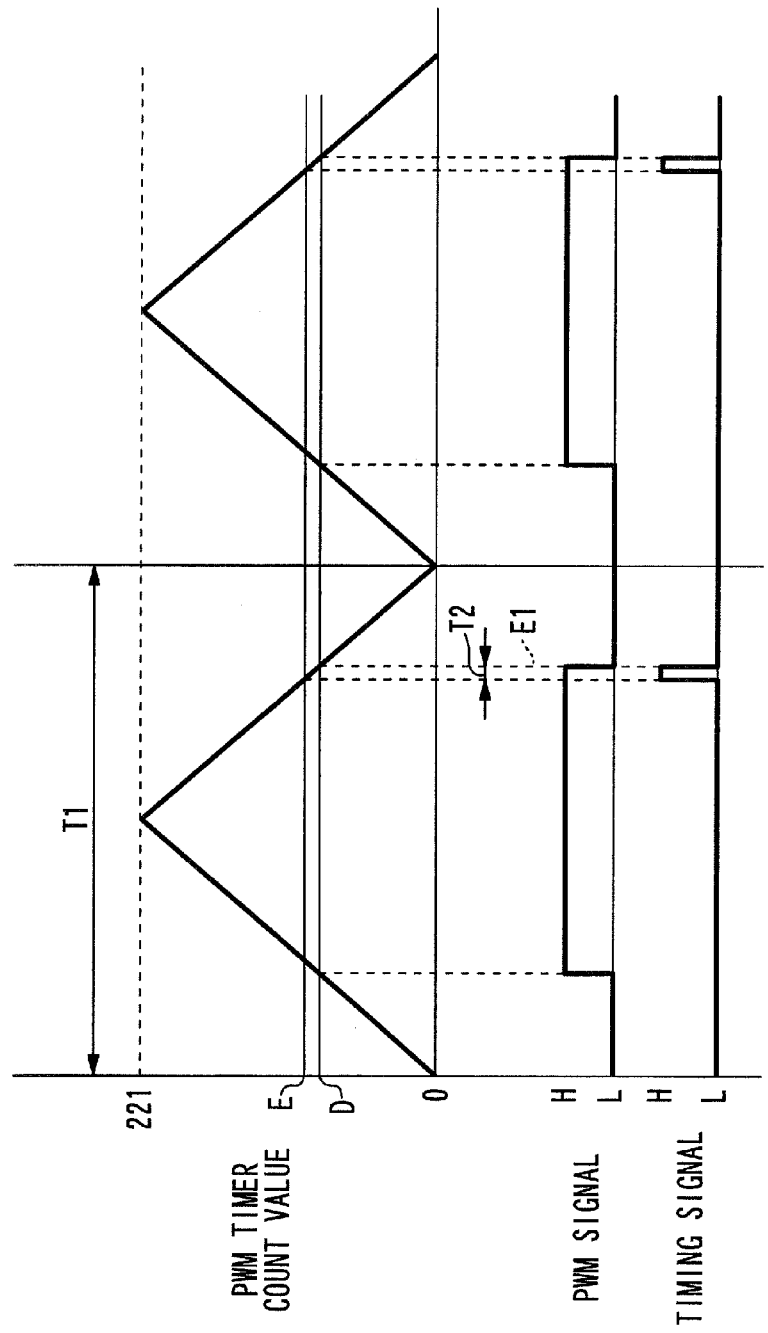
FIG. 3 is an explanatory view for explaining a detailed example of a PWM generation unit according to the first embodiment.

As shown in FIG. 3, according to the present embodiment, the PWM timer implements count up and count down in a predetermined range. For example, the PWM timer has an up/down counter having 222 steps from 0 to 221. In this case, the PWM timer may represent a 100% PWM output signal with a count value 0 and a 0% PWM output signal with a count value 221. For example, in a case of a configuration with a circuit clock of 8 MHz, one clock is 1/8 MHz=125 ns, and one cycle T1 is calculated by 125 ns×222×2=55.5 µs. Therefore, the PWM cycle in the present embodiment is 1/55.5 µs=18 kHz. The PWM generation unit 68 compares the count value generated by the PWM timer with the drive duty value D being a first threshold thereby to generate the PWM signal according to the comparison result. More specifically, the PWM generation unit 68 generates the PWM signal including a high-level signal (H) in a period, in which the count value counted by the PWM timer is greater than or equal to the drive duty value D, and a low-level signal (L) in a period, in which the count value is less than the drive duty value D. The PWM signal is generated according to the count value of a PWM timer, and a drive duty value D. Therefore, in the case shown in FIG. 3, the duty ratio of the PWM signal can be enlarged by setting the drive duty value D at a small value. Alternatively, the duty ratio of the PWM signal can be reduced by setting the drive duty value D at a large value. In this way, the duty ratio of the PWM signal can be changed according to the level of the drive duty value D.

Figure 4A:
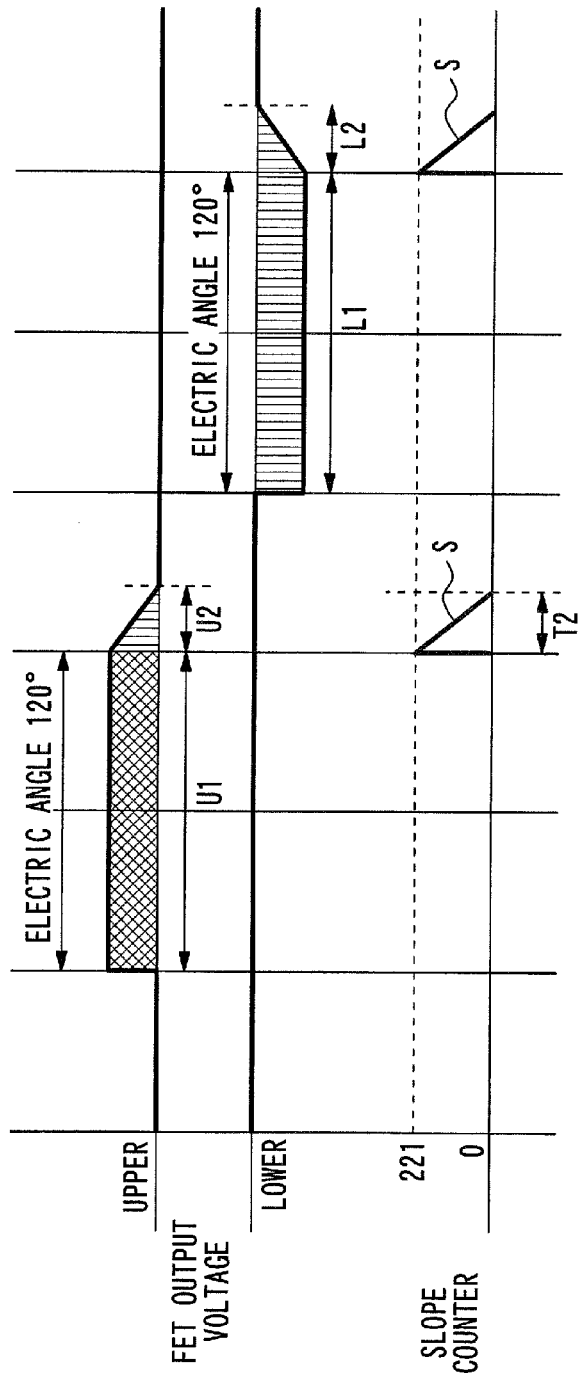
FIGS. 4A, 4B are explanatory views for explaining a detailed example of a slope counter according to the first embodiment.

As shown in FIG. 4A, the PWM generation unit 68 of the present embodiment outputs the PWM signal (refer to FIG. 3) generated using the PWM timer to each of the gates of the FETs 76U, 76V, 76W in the time period L1 corresponding to the electric angle of 120 degrees according to corresponding one of the hall sensors 52U, 52V, 52W. In addition, the PWM generation unit 68 outputs a predetermined signal without implementing the PWM control (not generated by using the PWM timer) to each of the gates of the FETs 74U, 74V, 74W in the time period U1 corresponding to the electric angle of 120 degrees according to corresponding one of the hall sensors 52U, 52V, 52W. For convenience of explanation, the signals outputted from the PWM generation unit 68 including both the signal generated using the PWM timer and the signal without implementing the PWM control are denoted by the PWM signal.

The PWM generation unit 68 of the present embodiment is controlled by the control unit 64 to implement the process described as follows in a predetermined time period from the time point at which the value of the voltage outputted from each of the FETs 74 and the FETs 76 to the coil 30 changes to zero. Specifically, the control unit 64 controls the PWM generation unit 68 to implement the process described as follows in the time period U2 corresponding to the FET 74 and in the time period L2 corresponding to the FET 76, as shown in FIG. 4A.

The PWM generation unit 68 determines the drive duty value D based on the count value of the slope counter 65 and causes the PWM timer to generate the PWM signal having the pulse width according to the determined drive duty value D. The PWM generation unit 68 further outputs the generated PWM signal to the gate of each of the FETs 74 and the gate of each of the FETs 76.

The slope counter 65 of the present embodiment is configured as a counter circuit. The slope counter 65 starts countdown from the time point, at which the value of the voltage outputted from each of the FETs 74 and each of the FETs 76 to the coil 30 changes to zero, according to the drive timing generated by the drive timing generating portion 62. Thus, the slope counter 65 outputs the count value to the control unit 64. As shown in FIG. 4A, in the present embodiment, the slope counter 65 starts the countdown at the time point, at which the output voltage of each of the FETs 74 and each of the FETs 76 changes to zero. The slope counter 65 further implements the countdown from the maximum count value 221 of the PWM timer to the minimum count value 0 and outputs the count value.

Figure 4B:
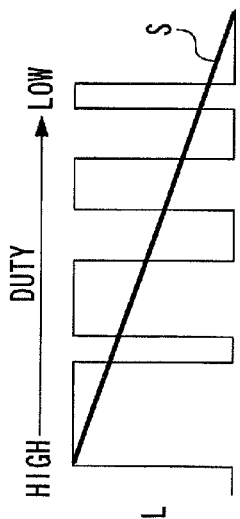

According to the present embodiment, the drive duty value D increases with gradual decrease in the count value (slope S) of the slope counter 65. In this way, the count value (slope S) of the slope counter 65 causes the FETs 74 to generate the output voltage in the time period U2 immediately after the time point (end of period U1) at which the output voltage of each of the FETs 74 changes to zero. FIG. 4B illustrates the change in the PWM signal. In FIG. 4B, the angle of the slope S is differed from that in FIG. 4A in consideration of convenience of explanation In the present embodiment, the slope counter 65 implements the countdown by 1 count=4 μS. Therefore, the countdown time (slope section) T2 is calculated as follows: T2=4 μS×222=0.888 ms. Therefore, in the present embodiment, 0.888 ms is the predetermined time period. The predetermined time period of the slope section is determined in consideration of the characteristic, the circuit characteristic, efficiency, and the like of the motor 16, according to a result of an experiment and the like.

The motor control device 10 of the present embodiment causes the current detection unit 72 to detect the electric current arbitrary flowing into the motor 16 in order to avoid an excessive electric current flow into the motor 16. The motor control device 10 further causes the sample hold circuit 73 to implement sample hold of the electric current detected by the current detection unit 72. When the electric current implemented with the sample hold exceeds the predetermined reference value, which represents an overloaded state, the motor control device 10 causes the protection circuit 70 to terminate the electricity supplied to the coil 30.

The PWM generation unit 68 of the present embodiment specifies a detection period, in which the value of the motor current flowing into each coil 30 of the motor 16 can be steadily detected. The PWM generation unit 68 further generates a timing signal, which represents the specified detection period, and outputs the generated timing signal to the sample hold circuit 73. Specifically, the PWM generation unit 68 determines a comparison value E for the sample hold. The comparison value E is a second threshold and set to be a greater value than the drive duty value D. The PWM generation unit 68 further compares the count value generated by the PWM timer, the comparison value E, and the drive duty value D and generates the timing signal according to the comparison result. According to the present embodiment, the comparison value E is set at a value calculated by adding one to the drive duty value D (=drive duty value D+1). As shown in FIG. 3, the PWM generation unit 68 generates the timing signal in the time period in which the PWM timer implements the countdown of the count value. The timing signal includes a high-level signal in the time period, in which the count value is less than or equal to the comparison value E and the count value is greater than the drive duty value D, and a low-level signal in the time period other than that of the high-level signal. In this way, according to the present embodiment, the generated timing signal includes the high-level signal in the time period T2. The high-level signal is from the time point in advance of the edge E1, at which the PWM signal changes from the high-level signal to the low-level signal, by one count value of the PWM timer to the edge E1. That is, the high-level signal is from the time point in advance of the edge E1 by one clock of the PWM timer to the edge E1. The time period T2 can be modified by changing the difference between the comparison value E and the drive duty value D.

The current detection unit 72 is provided on a power line 86 through which electricity is supplied from a substantially direct-current power source to the voltage supply portion 50. The substantially direct-current power source is constructed of the power source 80, the power factor improvement reactor 82, and the smoothing capacitors 84A and 84B. The current detection unit 72 arbitrary detects the electric current, which flows through the power line 86, and outputs the detected electric current to the sample hold circuit 73.

The sample hold circuit 73 implements the sample hold of the electric current inputted arbitrary from the PWM generation unit 68 at the time point at which the timing signal inputted from the current detection unit 72 changes to the high-level signal. The sample hold circuit 73 further holds the electric current as it is during the time period in which the timing signal is the high-level signal.

The protection circuit 70 is for avoiding destruction of the FETs 74 and the FETs 76 due to excessive heat. Specifically, the protection circuit 70 monitors whether the motor 16 is an overloaded state, according to the electric current held by the sample hold circuit 73. When an electric current flows into the coil 30 to cause the overloaded state, the protection circuit 70 forcedly deactivates all the FETs 74 and FETs 76 to be in the OFF state and terminates the electricity supply to the coil 30.

The voltage supply portion 50 is constructed of a three-phase (U-phase V-phase W-phase) inverter. As shown in FIG. 2, the voltage supply portion 50 includes three N-channel field effect transistors (MOSFETs) 74U, 74V, 74W (FETs 74U, 74V, 74W) each being an upper-stage switching element. The voltage supply portion 50 further includes three N-channel field effect transistors (MOSFETs) 76U, 76V, 76W (FETs 76U, 76V, 76W) each being a lower-stage switching element. Hereinafter, when the FETs 74U, 74V, 74W and FETs 76U, 76V, 76W need not be discriminated from each other, the FETs are denoted with general terms of FETs 74 and FETs 76. Alternatively, when the FETs 74U, 74V, 74W and FETs 76U, 76V, 76W need to be discriminated from each other, the FETs are denoted with symbols U, V, W.

Among the FETs 74 and FETs 76, the source of the FET 74U and the drain of the FET 76U are connected to the terminal of the coil 30U, the source of the FET 74V and the drain of the FET 76V are connected to the terminal of the coil 30V, and the source of the FET 74W and the drain of the FET 76W are connected to the terminal of the coil 30W.

The gates of the FET 74 and the FET 76 are connected to the PWM generation unit 68 and configured to receive the PWM signal. When the gates of the FET 74 and the FET 76 receive the PWM signal at H level, the FET 74 and the FET 76 are activated to be in the ON state, thereby to flow the electric current from the drain thereof into the source thereof. Alternatively, when the gates of the FET 74 and the FET 76 receive the PWM signal at L level, the FET 74 and the FET 76 are deactivated to be in the OFF state, in which the electric current does not flow from the drain thereof into the source thereof.

(Operation of Motor Control Device)

Subsequently, the operation of the motor control device 10 of the present embodiment will be described.

Figure 5:
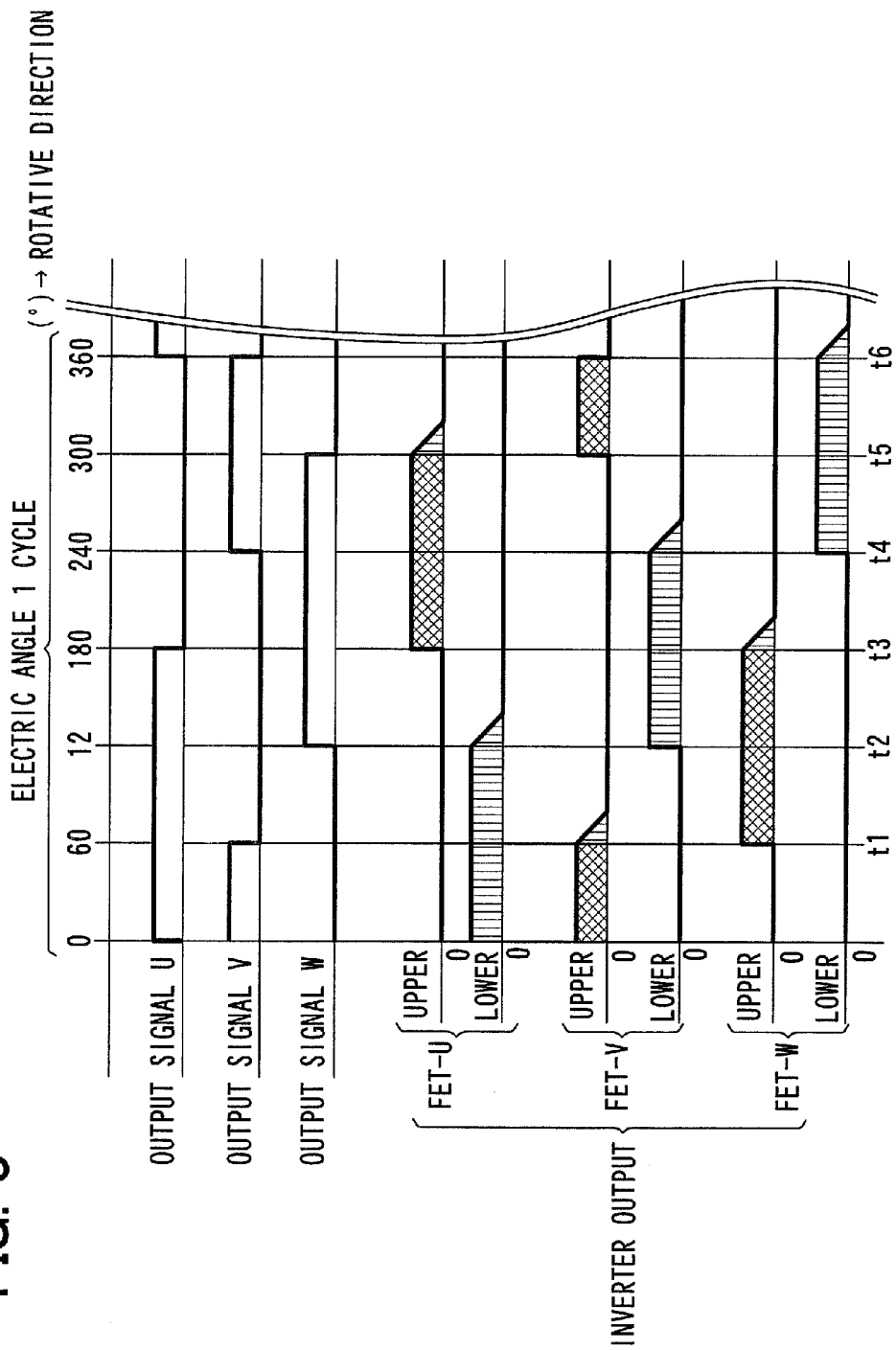
FIG. 5 is an example of a time chart showing the relation between an output signal of a hall sensor and an inverter output voltage of an energization component of the brushless motor according to the first embodiment.

FIG. 5 is an example of a time chart showing the output signals of the hall sensors 52U, 52V, 52W of the motor 16 of the present embodiment and the inverter output voltage of the voltage supply portion 50 in one cycle of the electric angle. In FIG. 5, the waveform denoted by "upper" shows the output signals from the FETs 74 of the upper stage, and the waveform denoted by "lower" shows the output signals from the FETs 76 of the lower stage. The output signals U, V, W at the H level represent the N pole, and output signals U, V, W at the L level represent the S pole.

According to the present configuration, the motor control device 10 causes the voltage supply portion 50 to apply the voltage to each of the three-phase coils 30 thereby to flow the electric current into each of the coils 30 in order. In this way, the coils 30 generate a revolving magnetic field thereby to rotate the rotor 22 of the motor 16.

As the rotor 22 rotates, each of the hall elements 52 detects the magnetic pole of the sensor magnet 40 and outputs the position detection signal each time detecting the magnetic pole. The outputted position detection signal is inputted into the drive timing generating portion 62 and the rotation speed detection unit 66.

The drive timing generating portion 62 derives the electricity supply period for each of the coils 30 and generates the timing of electricity supply to each coil 30, according to the output signals U, V, W inputted from the hall element 52 and representing the position of the rotor 22.

The rotation speed detection unit 66 detects the rotation speed of the rotor 22 according to the output signals U, V, W inputted from the hall element 52.

When being supplied with electricity from the standby circuit 60, the control unit 64 outputs the control signal to the PWM generation unit 68 for controlling the angular speed (advanced angle) of the rotor 22 according to the rotation speed of the rotor 22 instructed by the airconditioner ECU 78 and the drive timing generated by the drive timing generating portion 62.

The PWM generation unit 68 determines the drive duty value (DUTY) D according to the control signal inputted from control unit 64 and the output signal of the rotation speed detection unit 66, and the control of the control unit 64. As shown in FIG. 5, the PWM generation unit 68 further outputs the PWM signal to the gates of the FET 76U, 76V 76W and the gates of the FET 74U, 74V, 74W. The PWM generation unit 68 outputs the PWM signal, according to the signal, which is inputted from the drive timing generating portion 62 at the time point when electricity is supplied to each of the coils 30, in the time period corresponding to 120 degrees of the electric angle.

The PWM generation unit 68 specifies the detection period, in which the value of the motor current flowing into each coil 30 of the motor 16 can be steadily detected. The PWM generation unit 68 further generates the timing signal, which represents the specified detection period, and outputs the generated timing signal to the sample hold circuit 73.

Figure 6:
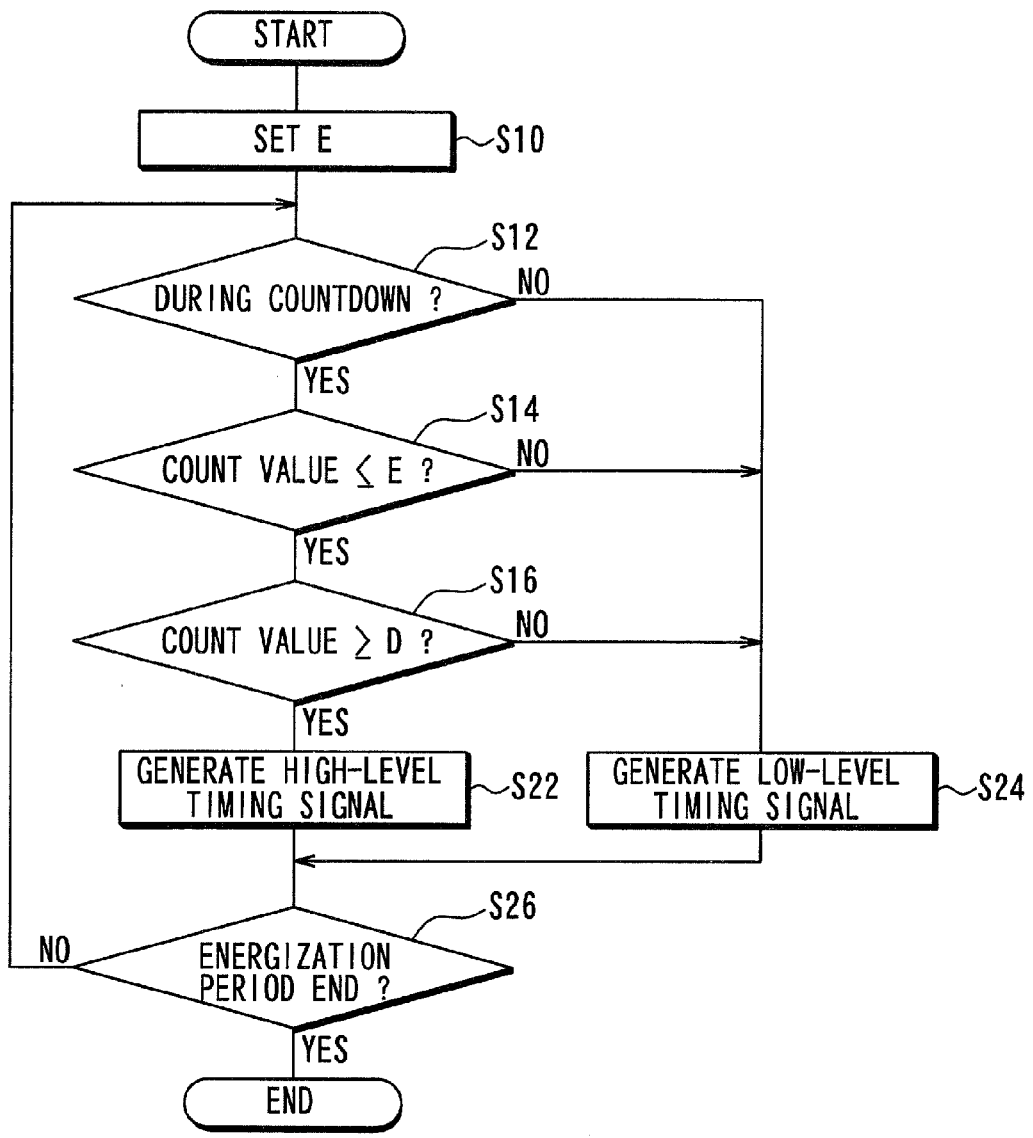
FIG. 6 is a flow chart showing an example of a detection period specifying processing according to the first embodiment.

FIG. 6 is a flow chart showing one example of a detection period specifying processing implemented by the PWM generation unit 68 to specify the detection period. In the present embodiment, the processing shown by the flow chart in FIG. 6 is started according to the signal inputted from the drive timing generating portion 62 in the time period in which electricity is supplied to the FET 76U, 76V, 76W.

At step S10, the comparison value E for the sample hold is set at a value calculated by adding one to the drive duty value D used for generation of the PWM signal.

At subsequent step S12, it is determined whether the present state is in a countdown period in which the PWM timer implements the countdown of the count value. When step S12 makes a positive determination, the processing proceeds to step S14. Otherwise, when step S12 makes a negative determination, the processing proceeds to step S24.

At step S14, it is determined whether the count value of the PWM timer is equal to or less than the threshold E. When step S14 makes a positive determination, the processing proceeds to step S16. Otherwise, when step S14 makes a negative determination, the processing proceeds to step S24.

At step S16, it is determined whether the count value of the PWM timer is equal to or greater than the drive duty value D. When step S16 makes a positive determination, the processing proceeds to step S22. Otherwise, when step S16 makes a negative determination, the processing proceeds to step S24.

At step S22, the timing signal being the high-level signal is generated and outputted on assumption that the present state is in the detection period in which the motor current value, which flows into each of the coils 30 of the motor 16, can be steadily detected.

Alternatively, at step S24, the timing signal being the low-level signal is generated and outputted.

At step S26, it is determined whether the electricity supply period ends. When step S26 makes a positive determination, the processing is terminated. Otherwise, when step S26 makes a negative determination, the processing proceeds to step S12.

In this way, the timing signal being the high-level signal is generated in the time period, in which the count value of the PWM timer is less than or equal to the comparison value E and the count value is greater than or equal to the drive duty value D. In addition, the timing signal being the low-level signal is generated in the time period other than the time period in which the high-level signal is generated.

Figure 7:
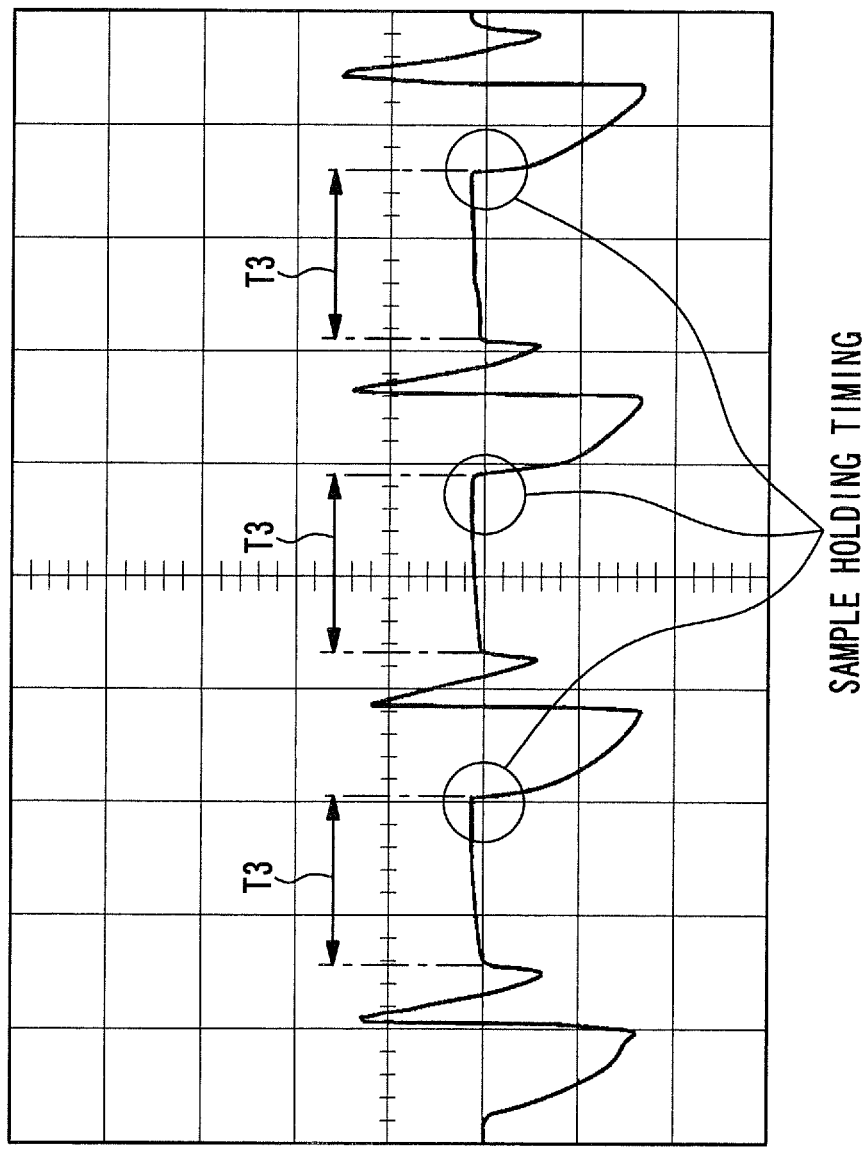
FIG. 7 is a waveform chart showing an electric current flowing through a power line according to the first embodiment.

FIG. 7 shows a current waveform, which flows through the power line 86.

The electric current, which flows through the power line 86, varies even in each ON period T3 in which the PWM signal being the high-level signal is supplied and the electric current flows into the coil 30.

Therefore, according to the present embodiment, the timing signal being the high-level signal is generated and outputted in the detection period of the electric current in which the motor current value is most stabilized in each ON period T3. The detection period of the electric current is determined to be the time period from a time point in advance of the end of each ON period T3 by the predetermined period to the end of the ON period T3.

The current detection unit 72 detects arbitrary the electric current, which flows through the power line 86, and outputs the detected electric current to the sample hold circuit 73. The sample hold circuit 73 implements the sample hold of the electric current inputted arbitrary from the current detection unit 72 at the time point at which the timing signal inputted from the PWM generation unit 68 changes to the high-level signal. The sample hold circuit 73 further holds the electric current as it is during the time period in which the timing signal is the high-level signal.

The protection circuit 70 forcedly deactivates all the FETs 74 and FETs 76 to be in the OFF state and terminates the electricity supply to the coil 30 when the electric current held by the sample hold circuit 73 exceeds the reference value.

The control unit 64 determines whether the electricity supply period ends and whether it is a time point at which the value of the voltage outputted from the FETs 74 or the FETs 76 to the coil 30 changes to zero, according to the signal inputted from the drive timing generating portion 62. In the time chart of FIG. 5, it is determined whether the present time point is one of the time points t1, t2, t3, t4, t5, t6.

When the present time point is one of the time points t1, t2, t3, t4, t5, t6, the control unit 64 starts the slope counter 65 to countdown the count value 221 and outputs the count value of the slope counter 65 to the PWM generation unit 68.

The PWM generation unit 68 gradually decreases the drive duty value D according to the duty value and the count value of the slope counter 65 thereby to determine the new drive duty value D successively. The PWM generation unit 68 further generates the PWM signal according to the determined drive duty value D and outputs the generated PWM signal to the gate of corresponding item of the FETs 74 and the FETs 76.

In this way, the asymmetrical wave-shaped voltage shown in FIG. 5 is applied from the FETs 74 and the FETs 76 to the coil 30.

As described above, according to the present embodiment, the specific time period in the electricity supply period, in which each of the coils 30 of the motor 16 is supplied with electricity, is specified with the detection period of the electric current, which flows into the coil 30 connected to the FETs 76 being switched from ON to OFF. The specific time period is from the time point in advance of the edge of the PWM signal by the predetermined period to the time point of the edge of the PWM signal. The PWM signal changes to the different level at the edge in order to switch the FETs 76 for controlling the electricity supply to each of the coils 30, from ON to OFF. Therefore, the motor current value of the brushless motor can be steadily detected in the specified detection period by detecting the electric current, which flows into the coil 30 connected to the FETs 76 switched from ON to OFF.

Figure 8:
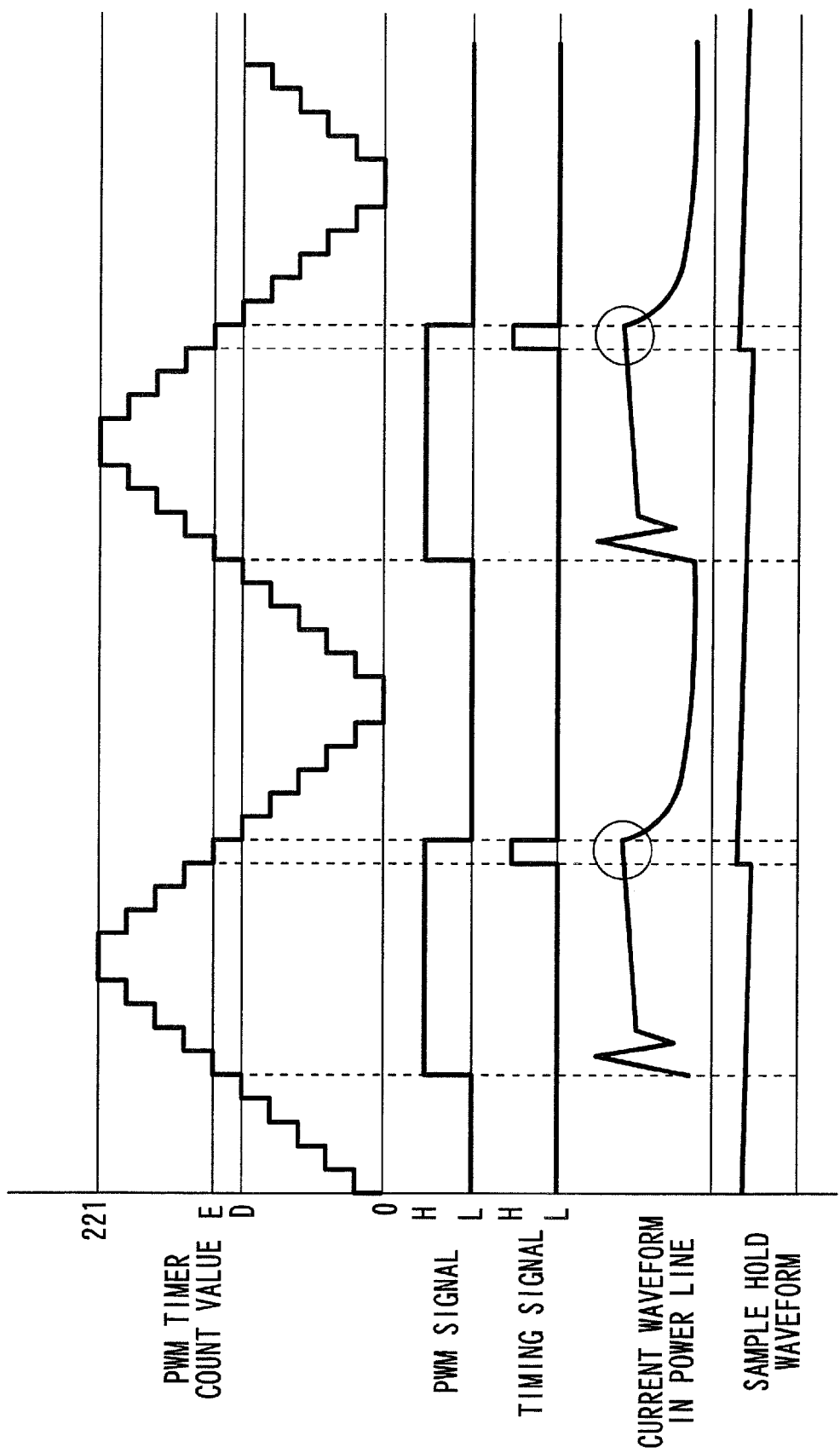
FIG. 8 is a waveform chart showing waveforms of various kinds of signals according to the first embodiment.

In addition, according to the present embodiment, as shown in FIG. 8, count up and countdown are repeatedly implemented to the count value of the PWM counter in the range of 0 to 221 in the electricity supply period. The count value of the PWM counter is compared with the drive duty value D thereby to generate the PWM signal having the high-level signal in the ON period in which the drive duty value D is greater than the count value of the PWM counter. Further, the detection period of the electric current is specified to be the specific period, in which the count value, to which countdown is implemented in the range of 0 to 221, is between the drive duty value D and the value greater than the drive duty value D by the comparison values E. Thereby, the detection time point, in which the motor current value of the brushless motor is steadily detectable, can be easily specified.

In addition, according to the present embodiment, the control unit 64 implements the control to apply the asymmetrical wave-shape voltage to the coil 30. The asymmetrical wave-shape voltage is generated by adding the count value of the slope counter 65 to the rectangular wave-shape voltage. In this way, switching of the electricity supply is smoothed. Thus, when the electricity supply is turned OFF to switch the phase of the energized motor, noise and vibration due to reflux electricity causing a torque ripple can be restrained.

In addition, the PWM control is implemented to add the count value of the slope counter 65. Therefore, the circuit can be constructed of a simple component, such as a custom IC, without employing a microcomputer or the like.

Therefore, in the motor control device 10 having the PWM control function, noise and vibration can be reduced with a simple circuit configuration. In addition, such a simple circuit configuration enables reduction in manufacturing cost.

Further, according to the present embodiment, the PWM control is implemented to the lower-stage FETs 76. Therefore, the circuit scale can be reduced, compared with a circuit having a complementary PWM control configuration.

In addition, the single element of the slope counter 65 can be used for all the FETs 74 and the FETs 76. Therefore, the circuit scale can be restrained from becoming large.

In addition, according to the present embodiment, when the count value of the slope counter 65 is the maximum value, the output voltage to the FETs 74 and the FETs 76 are set at the L level. In this way, in the case where the count value is the maximum value, very small electric current can be restricted from flowing into the coil 30, without setting the drive duty value at zero. Thus, the current waveform of the motor can be stabilized.

In addition, when the duty value D is zero, the duty is set at the full quantity. In this way, loss caused in the PWM control can be reduced, and the characteristic of the motor 16 in the full-output power state can be enhanced.

In the present embodiment, the detection period is specified with each ON period, in which the PWM signal activates the FETs 76U, 76V, 76W to be in the ON state, in the electricity supply period to the FETs 76U, 76V, 76W. The configuration is not limited to the above-described embodiment. In a configuration in which multiple ON periods exist in the electricity supply period, the motor current value is apt to be stabilized in the latter ON period. In consideration of this, the detection period may be specified with the ON period in which the PWM signal activates the FETs 76U, 76V, 76W finally in the electricity supply period.

Figure 9:
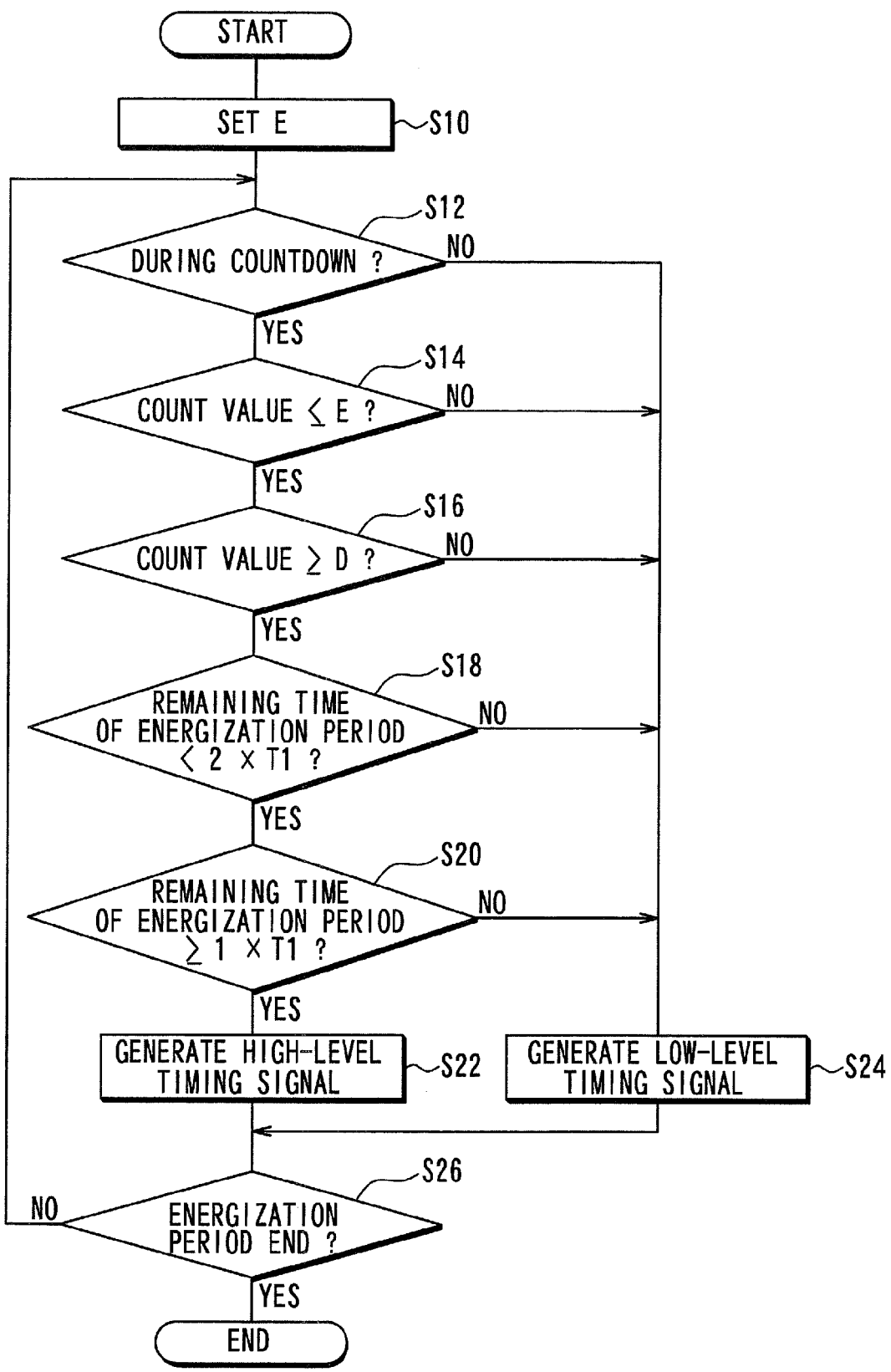
FIG. 9 is a flow chart showing an example of a detection period specifying processing according to a modification of the first embodiment.

FIG. 9 is a flow chart of an example of the method to specify the detection period with the ON period, in which the PWM generation unit 68 causes the PWM signal to activate the FETs 76U, 76V, 76W finally, in the electricity supply period. In the following description, the same reference numerals are given to the same processings in the embodiment (FIG. 6), and description thereof will be omitted.

The PWM timer implements the count up and the countdown in the range of 0 to 221 at one cycle T1 of 55.5 μs.

At step S18, it is determined whether the time period (remaining time) to the end of the electricity supply period is less than two of the cycles T1. When step S18 makes a positive determination, the processing proceeds to step S22. Otherwise, when step S18 makes a negative determination, the processing proceeds to step S24.

At step S20, it is determined whether the time period (remaining time) to the end of the electricity supply period is greater than or equal to one cycle T1. When step S20 makes a positive determination, the processing proceeds to step S22. Otherwise, when step S20 makes a negative determination, the processing proceeds to step S24.

In this way, when the time period to the end of the electricity supply period is less than the two cycles T1 and is greater than or equal to the one cycle T1 and when the present state is in the time period in which the PWM timer is enabled to implement the count up and the countdown by one cycle in the range of 0 to 221, the timing signal, which represents the detection period is generated and outputted. Thus, the motor current value can be detected more steadily.

In the present embodiment, the PWM generation unit 68 compares the count value generated by the PWM timer with the drive duty value D. The PWM generation unit 68 further generates the PWM signal being the high-level signal (H) in the time period in which the count value counted by the PWM timer is greater than or equal to the drive duty value D. The PWM generation unit 68 further generates the PWM signal being the low-level signal (L) in the time period in which the count value counted by the PWM timer is less that the drive duty value D. The PWM generation unit 68 further sets the comparison value E for the sample hold at the value greater than the drive duty value D. The configuration is not limited to the above-described embodiment. For example, a similar configuration may be employed to compare the drive duty value D with the count value generated by the PWM timer. In the present configuration, the PWM signal being the high-level signal (H) may be generated in the time period in which the count value counted by the PWM timer is less than or equal to the drive duty value D. In addition, the PWM signal being the low-level signal (L) may be generated in the time period in which the count value counted by the PWM timer is greater than the drive duty value D. In the present configuration, the comparison value E for the sample hold may be set to be less than the drive duty value D. Further, in the time period in which the PWM timer implements the count up of the count value, the timing signal being the high-level signal may be generated in the time period in which the count value is greater than or equal to the comparison value E and the count value is less than or equal to the drive duty value D. In addition, the timing signal being the low-level signal may be generated in the time period excluding the time period in which the timing signal is the high-level signal.

According to the present embodiment, the PWM generation unit 68 outputs the PWM signal, which is generated by using the PWM timer, only to the FETs 76. That is, in the present embodiment, the lower-stage PWM control configuration is employed to implement the PWM control to the FETs 76 at the lower stage, instead of the complementary PWM control configuration being generally used. The configuration is not limited to that of the above-described embodiment. For example, the complementary PWM control configuration may be employed. When the complementary PWM control configuration is employed, an electric angle counter, a dead time timer, and the like may be needed, in addition to the PWM timer. Consequently, the circuit scale may be enlarged. In addition, it may be difficult to output the applied voltage at the maximum value due to influence of the dead time. Therefore, the lower-stage PWM control configuration may have an advantage to a certain extent.

According to the present embodiment, the protection circuit 70 terminates the electricity supply to the coil 30 when the electric current being held by the sample hold circuit 73 exceeds the reference value. The configuration is not limited to the above-described embodiment. For example, the protection circuit 70 may terminate the electricity supply to the coil 30 when the electric current detected in the detection period exceeds the reference value continually for predetermined times. In this way, even when the electric current, which flows through the coil 30, exceeds the reference value temporarily due to a noise or the like, wrong termination of the electricity supply to the coil 30 can be avoided.

According to the present embodiment, the PWM generation unit 68 outputs the PWM signal, which is generated by using the PWM timer, only to the FETs 76. That is, in the present embodiment, the lower-stage PWM control configuration is employed to implement the PWM control to the FETs 76 at the lower stage, instead of the complementary PWM control configuration being generally used. The configuration is not limited to that of the above-described embodiment. For example, the complementary PWM control configuration may be employed. When the complementary PWM control configuration is employed, an electric angle counter, a dead time timer, and the like may be needed, in addition to the PWM timer. Consequently, the circuit scale may be enlarged. In addition, it may be difficult to output the applied voltage at the maximum value due to influence of the dead time. Therefore, the lower-stage PWM control configuration may have an advantage to a certain extent.

Figure 10A:
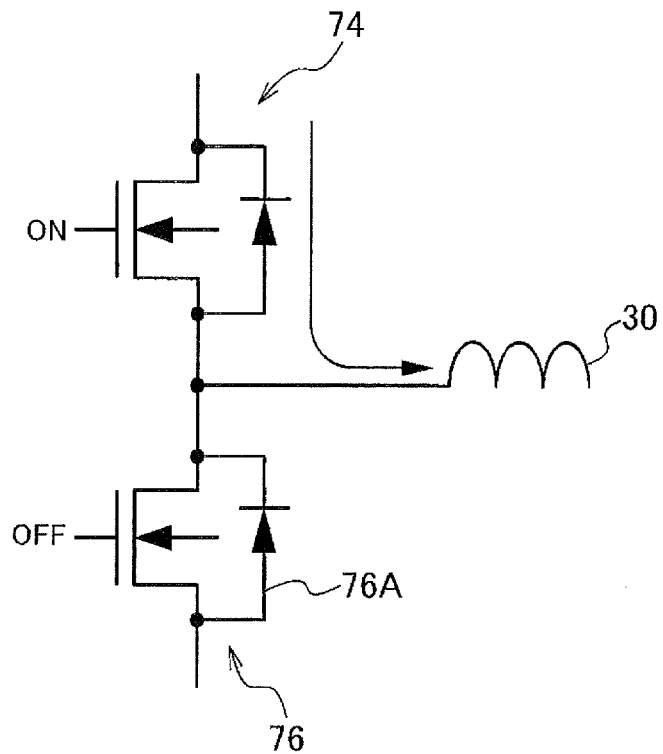
FIGS. 10A, 10B are explanatory views for explaining a lower-stage PWM control configuration according to the first embodiment.
Figure 10B:
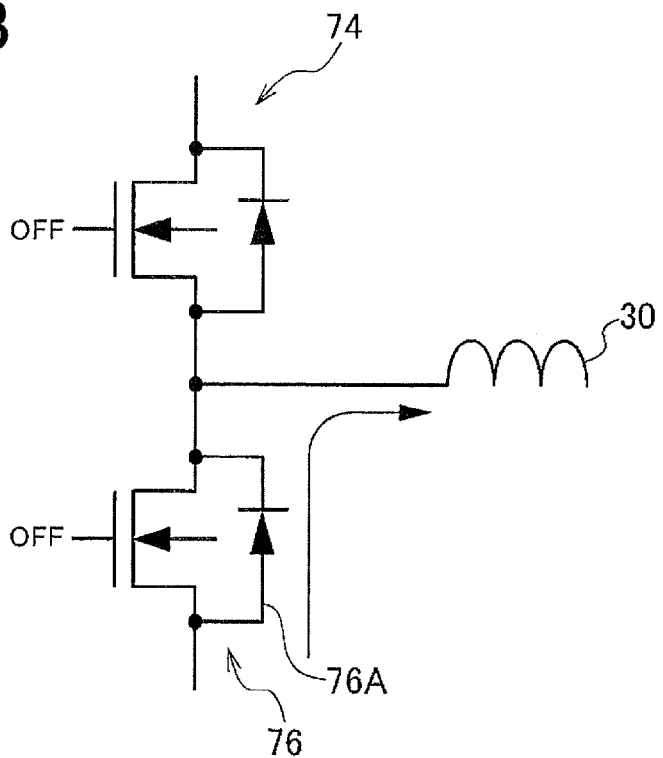
Figure 11A:
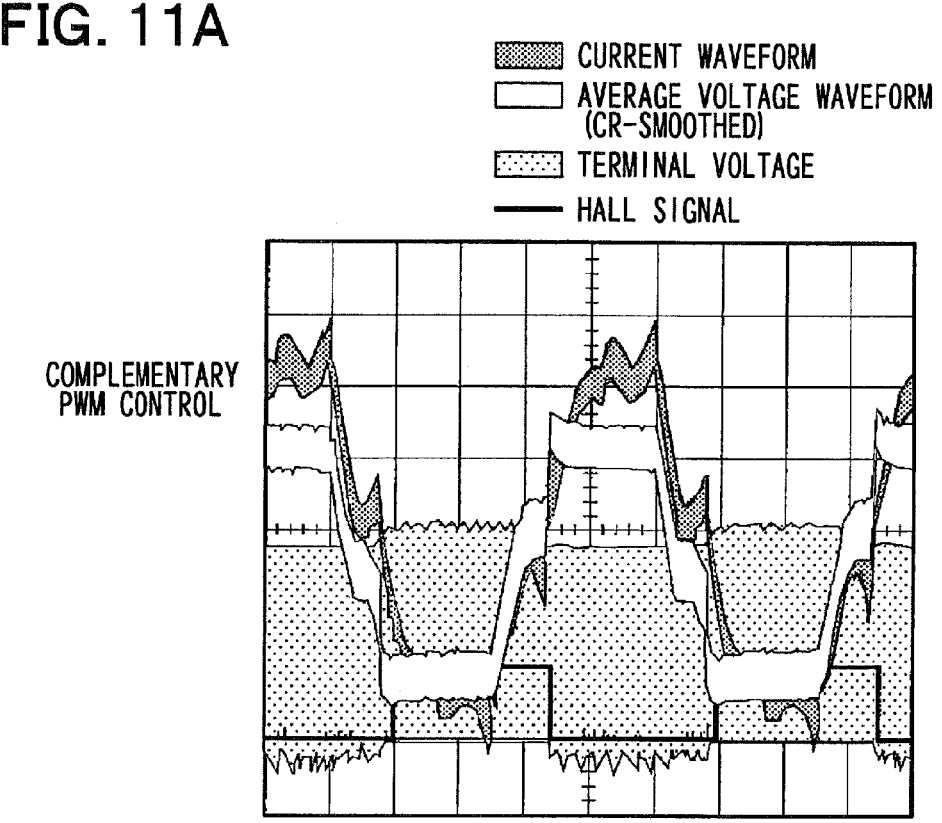
FIG. 11A is a waveform chart showing an example of an oscilloscope waveform of a complementary PWM control configuration.
Figure 11B:
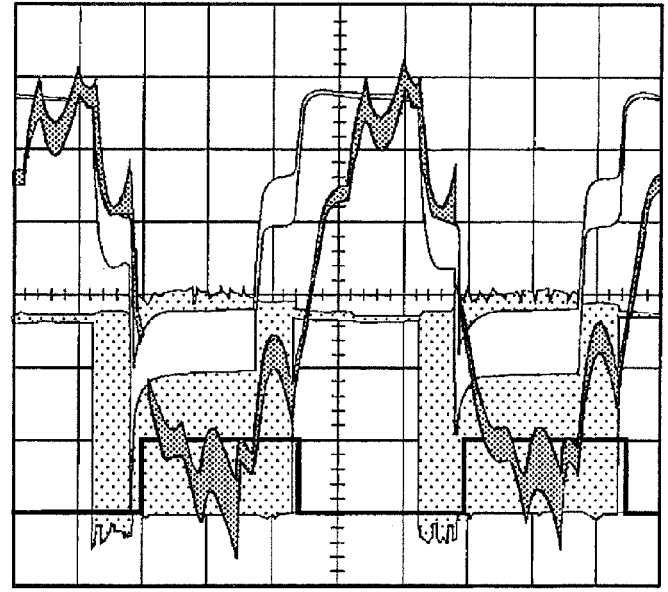
FIG. 11B is a waveform chart showing an example of an oscilloscope waveform of the lower-stage PWM control configuration.

Even in the lower-berth PWM control configuration of the above-described embodiment, the voltage application is implemented apparently, similarly to a complementary PWM control configuration. FIG. 10A shows the upper-stage FET 74 being in the ON state, and FIG. 10B shows the upper-stage FET 74 being in the OFF state. When the upper-stage FET 74 in the ON state is changed to the OFF state from the state shown in FIG. 10A to the state shown in FIG. 10B, the electric current tends to continue flowing due to an influence of a motor inductance. Consequently, an electric current flows through the diode 76A of the FET 76. Thus, although the FET 74 and the FET 76 are in the OFF state, a voltage at a low level is observed on the side of the coil 30. The present state is apparently similar to a state produced by implementing a complementary PWM control. FIG. 11A shows an oscilloscope waveform when a complementary PWM control configuration is employed to implement an asymmetrical electricity supply control of the present embodiment. FIG. 11B shows an oscilloscope waveform when the lower-stage PWM control configuration is employed to implement an asymmetrical electricity supply control of the present embodiment. As shown in FIGS. 11A, 11B, the PWM control is implemented only in a period from a first time point, at which the voltage value applied to the FET 74 changes to zero, to a second time point after elapse of a predetermined time period subsequent to the first time point. Thereby, a non-linear symmetry trapezoid wave with an ideal average voltage waveform is outputted to the coil 30, similarly to the complementary PWM control configuration.

According to the present embodiment, the count time of the slope counter 65 is set at a constant time irrespective of the rotation speed of the motor 16 thereby to fix the slope at an arbitrary value (arbitrary form). The configuration is not limited to this. The count quantity per time may be modified according to the rotation speed thereby to adjust the slope. Specifically, for example, an electric angle required for the countdown (down count) may be set at a constant value. In a configuration in which the slope is adjusted, the circuit configuration and the control may become complicated, compared with the configuration of the present embodiment. In addition, a processing load for computation of the drive duty value may also increase. It is confirmed experimentally that there is no large difference in the effect to restrain a noise, a vibration, etc between the configuration, in which the slope is fixed at an arbitrary value (arbitrary form), and the configuration, in which the slope is adjusted according to the rotation speed. Therefore, the slope may be fixed at an arbitrary value (arbitrary form), as described in the present embodiment, from a viewpoint of the effect and the cost.

In the present embodiment, the coil 30 is the star-type stator coil as shown in FIG. 2. The configuration is not limited to this. The coil 30 may be a delta-type stator coil. In the present embodiment, the motor includes the six-pole rotor magnet 24 as shown in FIG. 2. The configuration is not limited to this. The number of the poles may be arbitrary determined. A plastic magnet may be employed, instead of the rotor magnet 24.

Second Embodiment

As follows, the second embodiment will be described. In the present embodiment, the configuration of the brushless motor actuator and the configuration of the motor control device are equivalent to those in the first embodiment, and therefore, descriptions thereof are omitted. The reference numerals related to the configuration of the brushless motor actuator and the configuration of the motor control device in FIG. 1 and FIG. 2 will be used in the following description.

Figure 12:
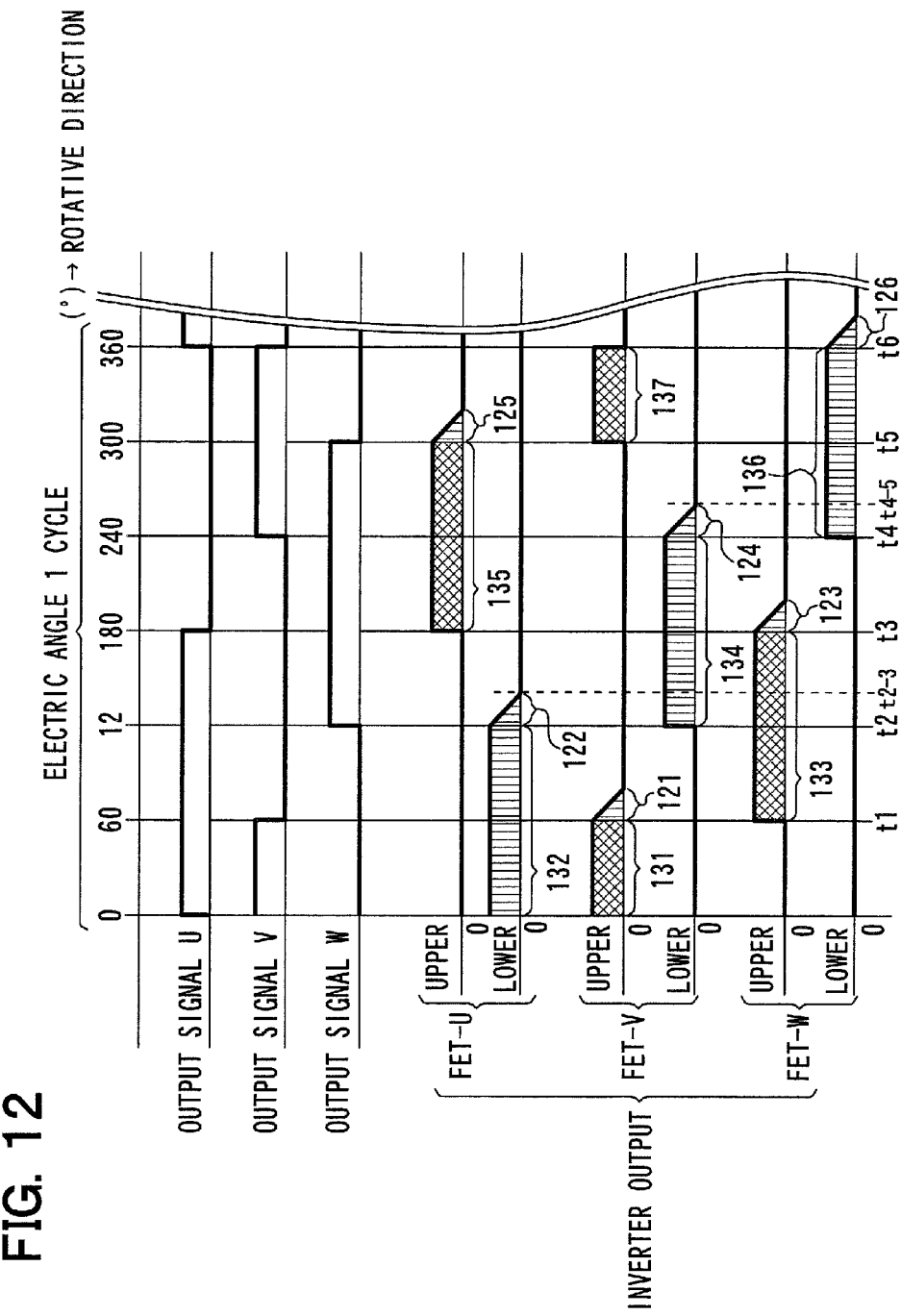
FIG. 12 is an example of a time chart showing the relation between the output signal of the hall sensor and the inverter output voltage of the energization component of the brushless motor according to the second embodiment.

FIG. 12 is an example of a time chart showing the relation between the output signal of the hall sensor and the inverter output voltage of the energization component of the brushless motor related to the present embodiment. In FIG. 12, slope periods 121 to 126 are respectively added to the right ends of the rectangular portions 131 to 136 in the end of the electricity supply to each coil of the brushless motor. In each of the slope periods 121 to 126, the duty ratio of the PWM signal is gradually reduced.

In the present embodiment, the lower-stage PWM control configuration is employed to implement the PWM control to the FETs 76 at the lower-stage, similarly to the first embodiment. Therefore, in the inverter output of FIG. 12, the motor is energized in the rectangular portions 132, 134, 136 and in the slope periods 122, 124, 126, and the motor is not energized in the crosshatched rectangular portions 131, 133, 135, 137 related to the FETs 74 at the upper stage.

It is noted that, in the configuration with the non-energization period, such as the rectangular portions 131, 133, 135, 137, the motor causes a reflux current. Therefore, in the present embodiment, the upper-stage FETs 74 are caused to perform the PWD control to reduce the duty ratio of the PWM signal gradually and to energize the motor thereby to restrain the reflux current in the slope periods 121, 123, 125 respectively subsequent to the non-energization period, similarly to the first embodiment.

In FIG. 12, the slope period 122 of the inverter output at the lower stage of the FET-U and the rectangular portion 134 of the inverter output at the lower stage of the FET-V overlap one another in the time period from the time point t2 to the time point t2-3. In addition, the slope period 124 of the inverter output at the lower stage of the FET-V and the rectangular portion 136 of the inverter output at the lower stage of the FET-W overlap one another in the time period from the time point t4 to the time point t4-5. That is, the slope period and the rectangular portion overlap one another in the same time zone (lap energization period).

In the lap energization period, the inverter output of the FET-U at the lower stage and the inverter output of the FET-V at the lower stage overlap one another in the time period from t2 to t2-3. Therefore, a large electric current flows into the motor. In addition, the inverter output of the FET-V at the lower stage and the inverter output of the FET-W at the lower stage overlap one another in the time period from t4 to t4-5. Therefore, a large electric current flows into the motor, similarly to the case in the lap energization period from t2 to t2-3.

Figure 13:
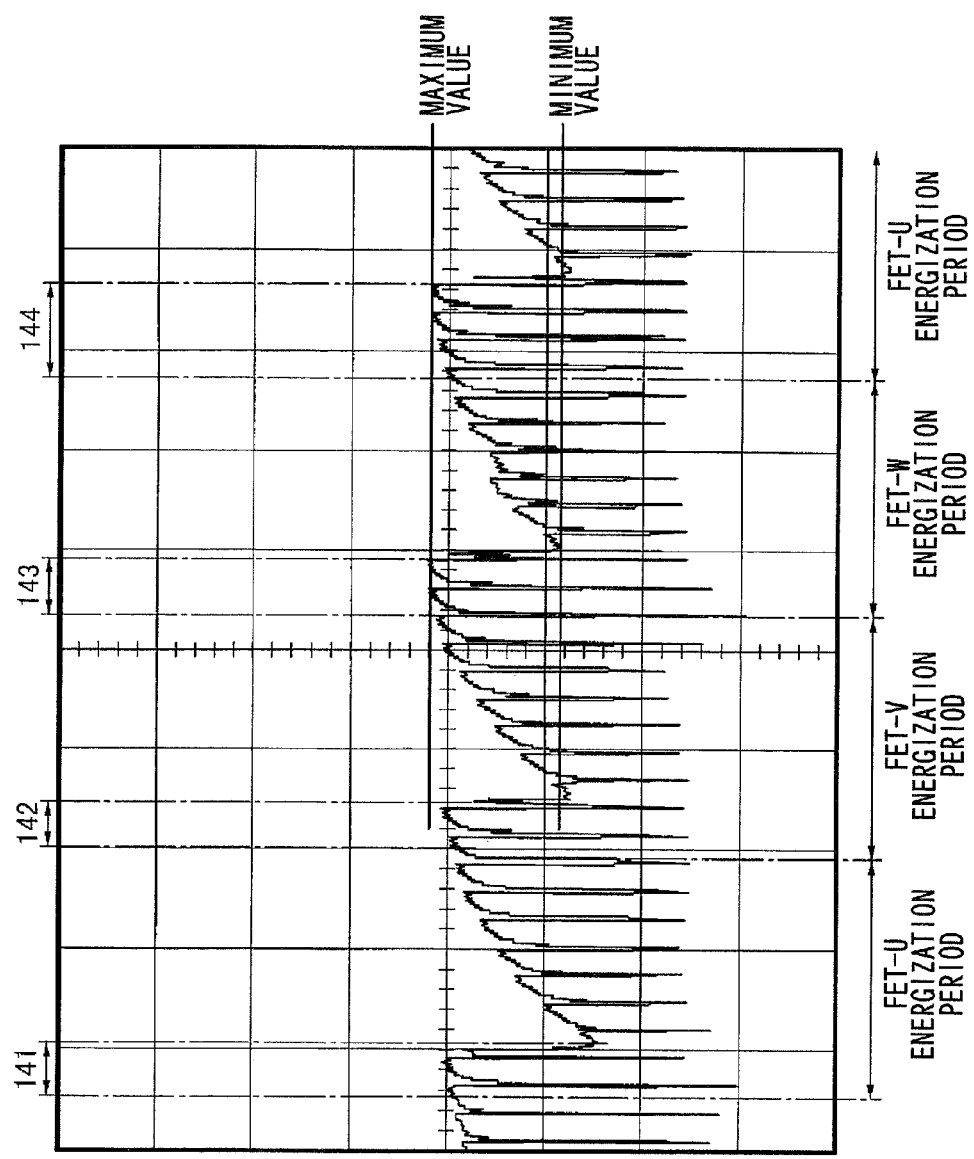
FIG. 13 is a waveform chart showing change in an electric current supplied to the motor according to the second embodiment.

FIG. 13 shows change in the electric current supplied to the motor. In FIG. 13, the FET-U at the lower stage, the FET-V at the lower stage, and the FET-W at the lower stage implement the PWM control alternately at the electric angle intervals of 120 degrees.

Referring to FIG. 13, the electric current supplied to the motor repeatedly pulsates. Specifically, the electric current becomes the minimum immediately after the end of the lap energization periods 141, 142, 143, 144, and thereafter increases to become the maximum immediately before the end of the subsequent lap energization period.

The electric current becomes the maximum immediately before the end of the lap energization period. Therefore, in the present state immediately before the end of the lap energization period, the electric current pulsates to fluctuate unstably. Thus, in the present state, detection error becomes large. In consideration of this, it may be desirable to output the timing signal for detecting the motor current value immediately after the start of the lap energization period. In FIG. 12, it may be desirable to output the timing signal for detecting the motor current value immediately after the end of each of the rectangular portions 132, 134, 136 of the inverter output.

Similarly to the first embodiment shown in FIG. 3, the PWM generation unit 68 specifies the detection period, in which the value of the motor current flowing into each coil 30 of the motor 16 can be steadily detected. The PWM generation unit 68 further generates the timing signal, which represents the specified detection period and outputs the generated timing signal to the sample hold circuit 73.

It is noted that, as described above, it may be desirable to output the timing signal for detecting the motor current value immediately after the end of each of the rectangular portions 132, 134, 136 of the inverter output shown in FIG. 12. Therefore, in the present embodiment, the timing signal is not generated in the time period other than the time period immediately after the end of each of the rectangular portions 132, 134, 136.

Figure 14:
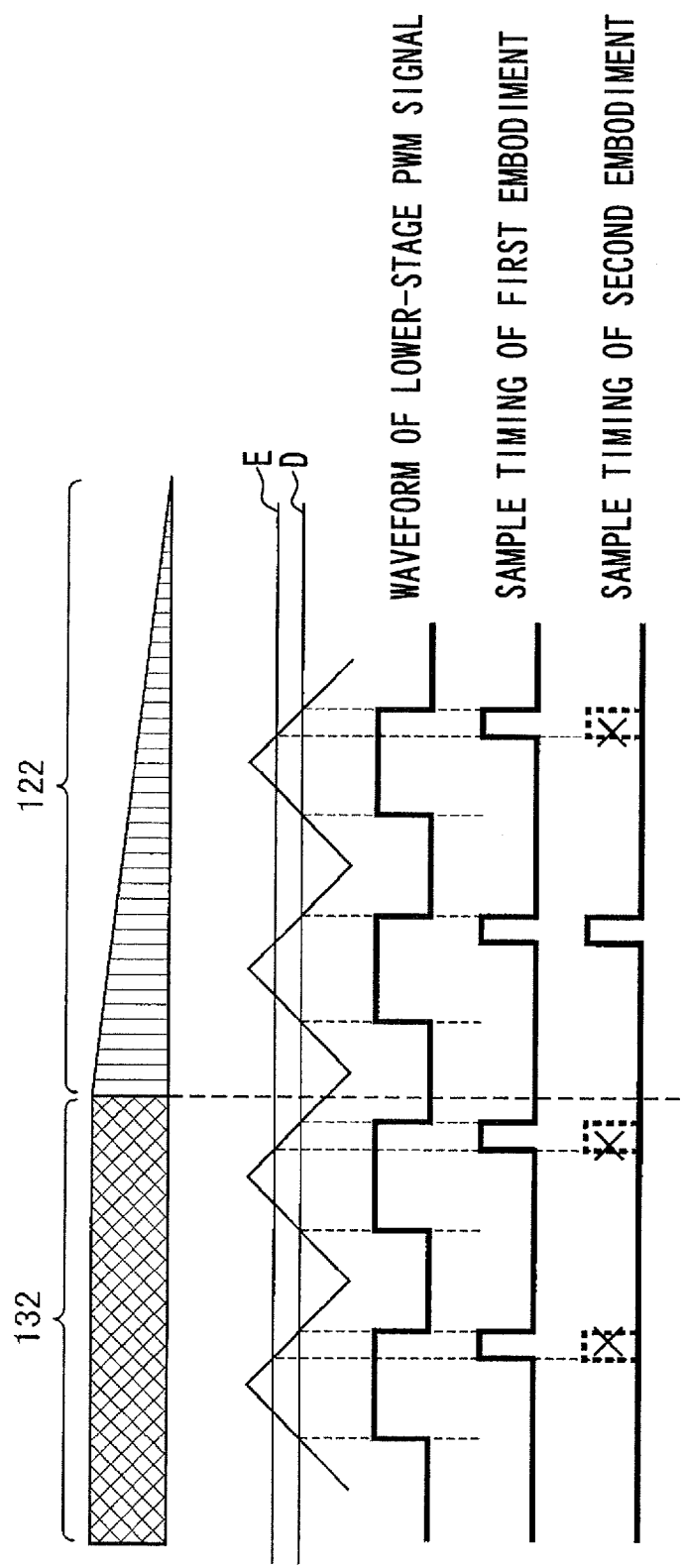
FIG. 14 is a view showing comparison among a rectangular portion and a slope section of the inverter output, a waveform of a lower-stage PWM signal, sample time points according to the first embodiment, and a sample time point according to the second embodiment.

FIG. 14 is a view showing comparison among the rectangular portion 132 and the slope section 122 of the inverter output shown in FIG. 12, the waveform of the lower-stage PWM signal, the sample time points (sample timings) according to the first embodiment, and the sample time point (sample timing) according to the second embodiment. According to the present second embodiment, only the timing signal first generated after the transition from the rectangular portion 132 to the slope section 122 is employed, and generation of the other timing signals is invalidated, dissimilarly to the first embodiment.

Therefore, according to the present embodiment, the timing signal generated at the time point (time period) immediately after the end of each of the rectangular portion 132, 134, 136 of the inverter output is employable as the control value. In this way, the motor current value is detectable in the portion of the lap energization period in which the motor current value substantially becomes the maximum.

Figure 15:
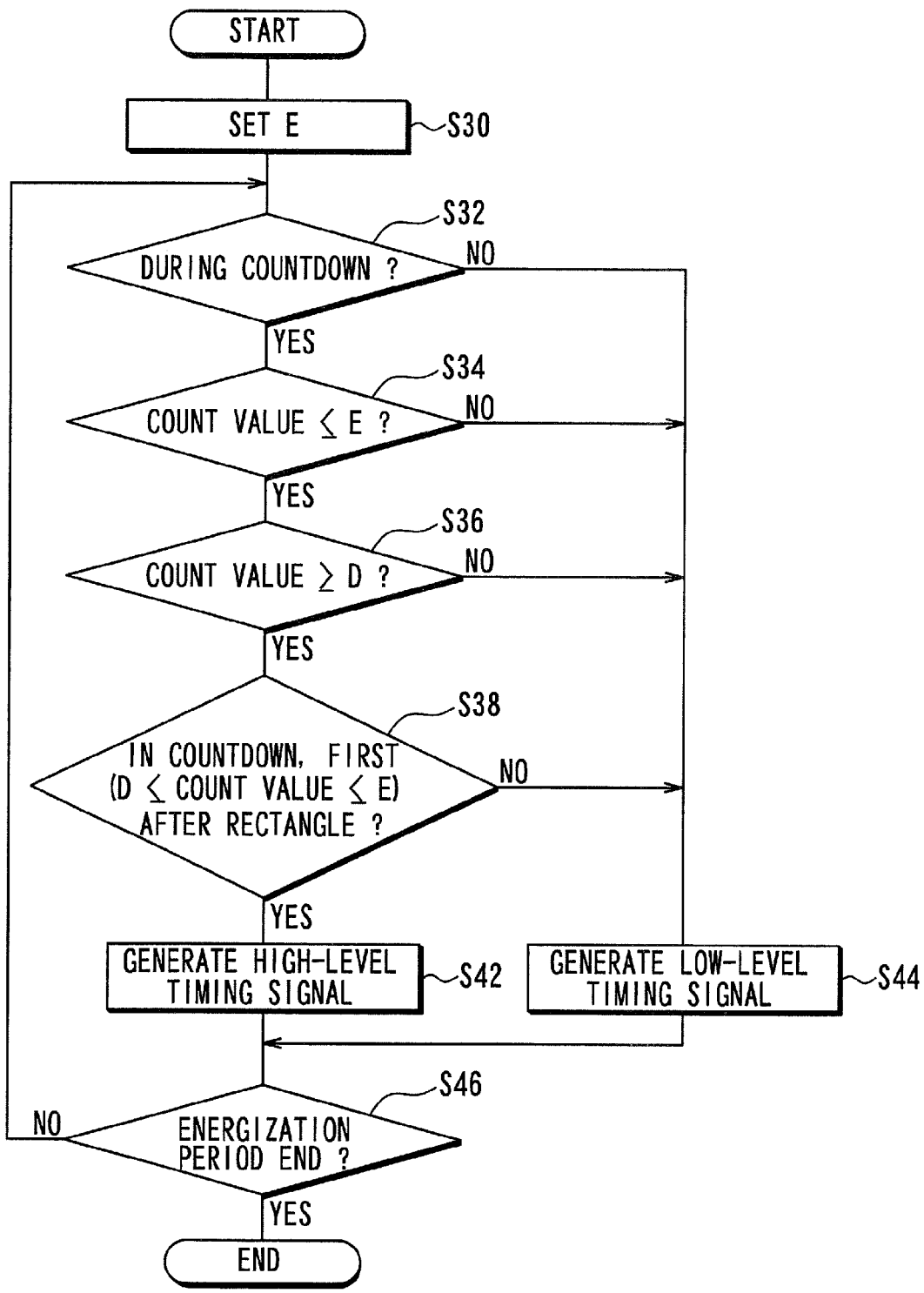
FIG. 15 is a flow chart showing an example of a detection period specifying processing according to the second embodiment.

FIG. 15 is a flow chart showing one example of a detection period specifying processing implemented by the PWM generation unit 68 to specify the detection period, according to the present embodiment. In the present embodiment, the processing shown by the flow chart in FIG. 15 is started according to the signal inputted from the drive timing generating portion 62 in the time period in which electricity is supplied to the FET 76U, 76V, 76W.

At step S30, the comparison value E for the sample hold is set at a value calculated by adding one to the drive duty value D used for generation of the PWM signal.

At subsequent step S32, it is determined whether the present state is in a countdown period in which the PWM timer implements the countdown of the count value. When step S32 makes a positive determination, the processing proceeds to step S34. Otherwise, when step S32 makes a negative determination, the processing proceeds to step S44.

At step S34, it is determined whether the count value of the PWM timer is equal to or less than the threshold E. When step S34 makes a positive determination, the processing proceeds to step S36. Otherwise, when step S34 makes a negative determination, the processing proceeds to step S44.

At step S36, it is determined whether the count value of the PWM timer is equal to or greater than the drive duty value D. When step S36 makes a positive determination, the processing proceeds to step S38. Otherwise, when step S36 makes a negative determination, the processing proceeds to step S44.

At step S38, it is determined whether the count value becomes greater than or equal to the drive duty value D and less than or equal to the comparison value E in the countdown period for the first time after the end of the rectangular portion in the energization period, according to the signal inputted from the drive timing generating portion 62. When step S38 makes a positive determination, the processing proceeds to step S42. Alternatively, when step S38 makes a negative determination, the processing proceeds to step S44.

At step S42, the timing signal being the high-level signal is generated and outputted on assumption that the present state is in the detection period in which the motor current value, which flows into each of the coils 30 of the motor 16, can be steadily detected.

Alternatively, at step S44, the timing signal being the low-level signal is generated and outputted.

At step S46, it is determined whether the slope period ends. When step S46 makes a positive determination, the processing is terminated. Otherwise, when step S46 makes a negative determination, the processing proceeds to step S32.

In this way, the timing signal being the high-level signal is generated in the time period, in which the count value of the PWM timer is greater than or equal to the drive duty value D, and the count value is less than or equal to the comparison value E. In addition, the timing signal being the low-level signal is generated in the time period other than the time period of the high-level signal.

As described above, in the brushless motor control device having the lower-stage PWM control configuration according to the present embodiment, the timing signal for detecting the electric current supplied to the motor is outputted in the lap energization period, in which the inverter output signals outputted from the lower-stage FETs overlap one another. Therefore, the maximum value of the electric current supplied to the motor is detectable.

In the present embodiment, the PWM generation unit 68 compares the count value generated by the PWM timer with the drive duty value D. The PWM generation unit 68 further generates the PWM signal being the high-level signal (H) in the period in which the count value counted by the PWM timer is greater than or equal to the drive duty value D. The PWM generation unit 68 further generates the PWM signal being the low-level signal (L) in the period in which the count value counted by the PWM timer is less that the drive duty value D. The PWM generation unit 68 further sets the comparison value E for the sample hold at the value greater than the drive duty value D.

The configuration is not limited to the above-described embodiment. For example, the PWM generation unit 68 may compare the count value generated by the PWM timer with the drive duty value D thereby to generate the high-level signal (H) in the period, in which the count value counted by the PWM timer is less than or equal to the drive duty value D, and the low-level signal (L) in the period, in which the count value is greater than the drive duty value D.

In this case, the comparison value E is set at a value less than the drive duty value D, and the PWM generation unit 68 generates the timing signal in the period in which the PWM timer implements the countdown of the count value. In this case, the timing signal includes the high-level signal in the period, in which the count value is greater than or equal to the comparison value E and the count value is less than or equal to the drive duty value D, and the low-level signal in the period other than that of the high-level signal.

According to the present embodiment, the PWM generation unit 68 outputs the PWM signal, which is generated by using the PWM timer, only to the FETs 76. That is, in the present embodiment, the lower-stage PWM control configuration is employed to implement the PWM control to the FETs 76 at the lower stage, instead of the complementary PWM control configuration being generally used. The configuration is not limited to that of the above-described embodiment. For example, the complementary PWM control configuration may be employed.

According to the present embodiment, the protection circuit 70 terminates the electricity supply to the coil 30 when the electric current being held by the sample hold circuit 73 exceeds the reference value. The configuration is not limited to the above-described embodiment. For example, the protection circuit 70 may terminate the electricity supply to the coil 30 when the electric current detected in the detection period exceeds the reference value continually for predetermined times.

By terminating the electricity supply to the coil 30 when the electric current detected in the detection period exceeds the reference value continually for predetermined times, wrong termination of the electricity supply to the coil 30 can be avoided, even when the electric current, which flows through the coil 30, exceeds the reference value temporarily due to a noise or the like.

According to the present embodiment, the count time of the slope counter 65 is set at a constant time irrespective of the rotation speed of the motor 16 thereby to fix the slope at an arbitrary value (arbitrary form). The configuration is not limited to this. The count quantity per time may be modified according to the rotation speed thereby to adjust the slope.

Specifically, for example, an electric angle required for the countdown (down count) may be set at a constant value.

Summarizing the above embodiments, the brushless motor control device includes a voltage application unit. The brushless motor includes the windings, which are respectively assigned with the multiple phases, and the permanent magnet. The windings of the brushless motor are correspondingly connected to the pair of switching elements. The brushless motor further includes the magneto rotor rotatable in response to the revolving magnetic field generated when the voltage is applied to the corresponding windings of the phases in order to flow an electric current into the corresponding windings. The voltage application unit is configured to cause each pair of switching elements to apply the voltage to the corresponding windings of the blushless motor. The brushless motor control device further includes an energization period derivation unit configured to detect rotation of the magneto rotor and to derive the energization period for the windings to generate the revolving magnetic field. The brushless motor control device further includes a PWM signal generation unit configured to: generate the PWM signal for causing the voltage application unit to activate and deactivate the switching elements at the duty ratio controlled according to the inputted control signal in the energization period of the windings derived by the derivation unit; generate the PWM signal at the duty ratio decreasing gradually to require the predetermined time period subsequent to the energization period; and output the generated PWM signal. The brushless motor control device further includes a detection period specifying unit configured to specify the detection period of the electric current, which flows into the windings connected to the switching elements previously activated and presently switched and deactivated, by the time period, which is to the time point of the edge of the PWM signal from the time point in advance of the edge by the predetermined period, in the energization period of the windings. The edge is caused when the PWM signal changes to the different level to switch to deactivate the switching elements previously activated to control the electricity supplied to the windings.

In the present configuration, the brushless motor includes the windings, which are respectively assigned with the multiple phases, and the permanent magnet. The windings of the brushless motor are correspondingly connected to the pair of switching elements of the voltage application unit. The brushless motor further includes the magneto rotor rotatable in response to the revolving magnetic field generated when the voltage is applied to the corresponding windings of the phases in order to flow an electric current into the corresponding windings. The voltage application unit is configured to cause each pair of switching elements to apply the voltage to the corresponding windings of the blushless motor. The energization period derivation unit detects rotation of the magneto rotor and derives the energization period of the windings for generating the revolving magnetic field.

The brushless motor control device further includes the PWM signal generation unit configured to generate the PWM signal for causing the voltage application unit to activate and deactivate the switching elements, such that the duty ratio decreases gradually to require the predetermined time period subsequent to the energization period, and to output the generated PWM signal. The duty ratio is controlled according to the control signal inputted in the energization period of the windings and is derived by the derivation unit.

The brushless motor control device further includes a detection period specifying unit configured to specify the detection period of the electric current, which flows into the windings connected to the switching elements previously activated and presently switched and deactivated, by the time period, which is to the time point of the edge of the PWM signal from the time point in advance of the edge by the predetermined period, in the energization period of the windings. The edge is caused when the PWM signal changes to the different level to switch to deactivate the switching elements previously activated to control the electricity supplied to the windings.

In the present configuration, the specific time period in the electricity supply period, in which each of the coils of the blushless motor is supplied with electricity, is specified as the detection period of the electric current, which flows into the winding connected to the switching elements being switched from ON to OFF (from activation to deactivation). The specific time period is from the time point in advance of the edge of the PWM signal by the predetermined period to the time point of the edge of the PWM signal. The PWM signal changes to the different level at the edge in order to switch the switching elements for controlling the electricity supply to the coil, from ON to OFF. Therefore, the motor current value of the brushless motor can be steadily detected in the specified detection period by detecting the electric current, which flows into the winding connected to the switching elements switched from ON to OFF.

The PWM signal generation unit may be further configured to generate the PWM signal for switching activation and deactivation of the switching elements according to the comparison result between the count value, which is increased and decreased by count up and countdown repeatedly implemented in the predetermined range, and the first threshold, which is determined according to the control signal, in the energization period. In this case, the detection period specifying unit may be further configured to: in a case where the PWM signal generation unit generates the PWM signal to activate the switching elements in the period, in which the count value is greater than the first threshold, specify the detection period of the electric current by the time period, in which the count value, which is implemented with count down in the predetermined range, is between the first threshold and the second threshold, which is greater than the first threshold; and in a case where the PWM signal generation unit generates the PWM signal to activate the switching elements in the period, in which the count value is less than the first threshold, specify the detection period of the electric current by a time period, in which the count value, which is implemented with count up in the predetermined range, is between the first threshold the and a third threshold, which is less than the first threshold.

The brushless motor control device may further include a protection unit configured to: detect the electric current, which flows through the windings connected to the switching elements being previously activated and presently switched and deactivated, in the detection period specified by the detection period specifying unit; and terminate the electricity supplied from the voltage application unit to the windings when the detected electric current exceeds the predetermined reference value.

The protection unit may be further configured to terminate the electricity supplied from the voltage application unit to the windings when the electric current detected in the detection period exceeds the predetermined reference value continually for the predetermined times.

The detection period specifying unit may be further configured to specify the detection period by the activation period in which the PWM signal activates the switching elements finally in the energization period.

The brushless motor may be formed integrally with the brushless motor control device.

With the present configuration, the motor current value can be detected steadily.

Alternatively, the brushless motor control device includes the voltage application unit. The brushless motor includes the windings, which are respectively assigned with the multiple phases, and the permanent magnet. The windings of the brushless motor are correspondingly connected to the pair of switching elements. The brushless motor further includes the magneto rotor rotatable in response to the revolving magnetic field generated when the voltage is applied to the corresponding windings of the phases in order to flow an electric current into the corresponding windings. The voltage application unit is configured to cause each pair of switching elements to apply the voltage to the corresponding windings of the blushless motor. The brushless motor control device further includes the energization period derivation unit configured to detect rotation of the magneto rotor and to derive the energization period for the windings to generate the revolving magnetic field. The brushless motor control device further includes a PWM signal generation unit configured to: generate the PWM signal for causing the voltage application unit to activate and deactivate the switching elements at the duty ratio controlled according to the inputted control signal in the energization period of the windings derived by the derivation unit; generate the PWM signal at the duty ratio decreasing gradually to require the predetermined time period subsequent to the energization period; and output the generated PWM signal. The duty ratio is controlled according to the control signal inputted in the energization period of the windings derived by the derivation unit. The brushless motor control device further includes a detection period specifying unit configured to specify the detection period of the electric current, which flows into the windings connected to the switching elements previously activated and presently switched and deactivated, by first one of time periods subsequent to the end of the energization period of the windings. Each of the time periods is to the edge time point of the edge of the PWM signal from the time point in advance of the edge by the predetermined period. The edge is caused when the PWM signal changes to the different level to switch to deactivate the switching elements previously activated to control the electricity supplied to the windings.

In the present configuration, the brushless motor includes the windings, which are respectively assigned with the multiple phases, and the permanent magnet. The windings of the brushless motor are correspondingly connected to the pair of switching elements of the voltage application unit. The brushless motor further includes the magneto rotor rotatable in response to the revolving magnetic field generated when the voltage is applied to the corresponding windings of the phases in order to flow an electric current into the corresponding windings. The voltage application unit is configured to cause each pair of switching elements to apply the voltage to the corresponding windings of the blushless motor. The energization period derivation unit detects rotation of the magneto rotor and derives the energization period of the windings for generating the revolving magnetic field.

The brushless motor control device further includes the PWM signal generation unit configured to generate the PWM signal for causing the voltage application unit to activate and deactivate the switching elements, such that the duty ratio decreases gradually to require the predetermined time period subsequent to the energization period, and to output the generated PWM signal. The duty ratio is controlled according to the control signal inputted in the energization period of the windings and is derived by the derivation unit.

The detection period specifying unit is configured to specify the detection period of the electric current, which flows into the windings connected to the switching elements previously activated and presently switched and deactivated, by first one of time periods subsequent to the end of the energization period of the windings. Each of the time periods is to the edge time point of the edge of the PWM signal from the time point in advance of the edge by the predetermined period. The edge is caused when the PWM signal changes to the different level to switch to deactivate the switching elements previously activated to control the electricity supplied to the windings.

In the present configuration, the detection period of the electric current, which flows into the winding connected to the switching elements being switched from ON to OFF (from activation to deactivation), is specified by first one of specific time periods subsequent to the end of the energization period of the windings. That is, the detection period is specified by one of the specific time periods, which occurs first subsequent to the end of the energization period. Each of the specific time period is from the time point in advance of the edge of the PWM signal by the predetermined period to the time point of the edge of the PWM signal. The PWM signal changes to the different level at the edge in order to switch the switching elements for controlling the electricity supply to the coil, from ON to OFF. Therefore, the motor current value of the brushless motor can be steadily detected in the specified detection period by detecting the electric current, which flows into the winding connected to the switching elements switched from ON to OFF.

The PWM signal generation unit may be further configured to generate the PWM signal for switching activation and deactivation of the switching elements according to the comparison result between the count value, which is increased and decreased by count up and countdown repeatedly implemented in the predetermined range, and the first threshold, which is determined according to the control signal, in the energization period.

In this case, the detection period specifying unit may be further configured to: in a case where the PWM signal generation unit generates the PWM signal to activate the switching elements in a period, in which the count value is greater than the first threshold, specify the detection period of the electric current by first one of time periods subsequent to the end of the energization period. In each of the time periods, the count value, which is implemented with count down in the predetermined range, is between the first threshold and the second threshold, which is greater than the first threshold; and in a case where the PWM signal generation unit generates the PWM signal to activate the switching elements in the period, in which the count value is less than the first threshold, specify the detection period of the electric current by first one of time periods subsequent to the end of the energization period. In each of the time periods, the count value, which is implemented with count up in the predetermined range, is between the first threshold and a third threshold, which is less than the first threshold.

The above structures of the embodiments can be combined as appropriate. The above processings such as calculations and determinations are not limited being executed by the control unit 64. The control unit may have various structures including the control unit 64 shown as an example.

The above processings such as calculations and determinations may be performed by any one or any combinations of software, an electric circuit, a mechanical device, and the like.

The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A brushless motor control device comprising:
   a voltage application unit configured to cause each pair of switching elements connected to corresponding windings of a plurality of phases to apply a voltage to the corresponding windings of the phases in order to flow an electric current into the corresponding windings to generate a revolving magnetic field with a permanent magnet to rotate a magneto rotor of a brushless motor;
   an energization period derivation unit configured to detect rotation of the magneto rotor and to derive an energization period of the windings to generate the revolving magnetic field;
   a PWM signal generation unit configured to:
      generate a PWM signal at a duty ratio, which is controlled according to an inputted control signal, in the energization period derived by the derivation unit;
      generate a PWM signal at a duty ratio decreasing gradually in a predetermined time period subsequent to the energization period; and
      output the generated PWM signal for causing the voltage application unit to activate and deactivate the switching elements; and
   a detection period specifying unit configured to specify a detection period of the electric current flowing into the windings connected to the switching elements, which are presently switched and deactivated, by a time period, which is from a time point in advance of an edge of the PWM signal by a predetermined period to the edge, the edge being caused when the PWM signal changes to a different level to switch to deactivate the switching elements to control an electric current supplied to the windings;
   wherein the PWM signal generation unit is further configured to generate the PWM signal for switching activation and deactivation of the switching elements according to a comparison result between a count value, which is increased and decreased by count up and countdown repeatedly implemented in a predetermined range, and a first threshold, which is determined according to the control signal,
   the detection period specifying unit is further configured to,
      in a case where the PWM signal generation unit generates the PWM signal to activate the switching elements in a period in which the count value is greater than the first threshold,
         specify the detection period by a time period, in which the count value, which is implemented with count down in the predetermined range, is between the first threshold and a second threshold, which is greater than the first threshold, and
   the detection period specifying unit is further configured to,
      in a case where the PWM signal generation unit generates the PWM signal to activate the switching elements in a period in which the count value is less than the first threshold,
         specify the detection period by a time period, in which the count value, which is implemented with count up in the predetermined range, is between the first threshold and a third threshold, which is less than the first threshold.

2. The brushless motor control device according to claim 1, further comprising:
   a protection unit configured to:
      detect an electric current, which flows through the windings connected to the switching elements being previously activated and presently switched and deactivated, in the detection period specified by the detection period specifying unit; and
      terminate the electric current supplied from the voltage application unit to the windings when the detected electric current exceeds a predetermined reference value.

3. The brushless motor control device according to claim 2, wherein the protection unit is further configured to terminate an electric current supplied from the voltage application unit to the windings when the electric current detected in the detection period exceeds a predetermined reference value continually for predetermined times.

4. The brushless motor control device according to claim 1, wherein the detection period specifying unit is further configured to specify the detection period by an activation period in which the PWM signal activates the switching elements finally in the energization period.

5. A brushless motor formed integrally with the brushless motor control device according to claim 1.

6. A brushless motor control device comprising:
   a voltage application unit configured to cause each pair of switching elements connected to corresponding windings of a plurality of phases to apply a voltage to the corresponding windings of the phases in order to flow an electric current into the corresponding windings to generate a revolving magnetic field with a permanent magnet to rotate a magneto rotor of a brushless motor;
   an energization period derivation unit configured to detect rotation of the magneto rotor and to derive an energization period of the windings to generate the revolving magnetic field;
   a PWM signal generation unit configured to:
      generate a PWM signal at a duty ratio, which is controlled according to an inputted control signal, in the energization period derived by the derivation unit;
      generate a PWM signal at a duty ratio decreasing gradually in a predetermined time period subsequent to the energization period; and
      output the generated PWM signal for causing the voltage application unit to activate and deactivate the switching elements; and
   a detection period specifying unit configured to specify a detection period of the electric current flowing into the windings connected to the switching elements, which are presently switched and deactivated, by first one of time periods subsequent to an end of the energization period, each of the time periods being from a time point in advance of an edge of the PWM signal by a predetermined period to the edge, the edge being caused when the PWM signal changes to a different level to switch to deactivate the switching elements to control an electric current supplied to the windings;

wherein the PWM signal generation unit is further configured to generate the PWM signal for switching activation and deactivation of the switching elements according to a comparison result between a count value, which is increased and decreased by count up and countdown repeatedly implemented in a predetermined range, and a first threshold, which is determined according to the control signal, the detection period specifying unit is further configured to, in a case where the PWM signal generation unit generates the PWM signal to activate the switching elements in a period in which the count value is greater than the first threshold, specify the detection period by first one of time periods subsequent to the end of the energization period, wherein in each of the time periods, the count value, which is implemented with count down in the predetermined range, is between the first threshold and a second threshold, which is greater than the first threshold, and the detection period specifying unit is further configured to, in a case where the PWM signal generation unit generates the PWM signal to activate the switching elements in a period in which the count value is less than the first threshold, specify the detection period by first one of time periods subsequent to the end of the energization period, wherein in each of the time periods, the count value, which is implemented with count up in the predetermined range, is between the first threshold and a third threshold, which is less than the first threshold.

7. The brushless motor control device according to claim 6, further comprising: a protection unit configured to: detect an electric current, which flows through the windings connected to the switching elements being previously activated and presently switched and deactivated, in the detection period specified by the detection period specifying unit; and terminate the electric current supplied from the voltage application unit to the windings when the detected electric current exceeds a predetermined reference value.

8. The brushless motor control device according to claim 7, wherein the protection unit is further configured to terminate an electric current supplied from the voltage application unit to the windings when the electric current detected in the detection period exceeds a predetermined reference value continually for predetermined times.

9. A brushless motor formed integrally with the brushless motor control device according to claim 6.

* * * * *